US008762305B1

(12) United States Patent
Chelian et al.

(10) Patent No.: US 8,762,305 B1
(45) Date of Patent: Jun. 24, 2014

(54) METHOD AND SYSTEM FOR DYNAMIC TASK SELECTION SUITABLE FOR MAPPING EXTERNAL INPUTS AND INTERNAL GOALS TOWARD ACTIONS THAT SOLVE PROBLEMS OR ELICIT REWARDS

(75) Inventors: Suhas E. Chelian, Encino, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 271 days.

(21) Appl. No.: 13/287,953

(22) Filed: Nov. 2, 2011

Related U.S. Application Data

(60) Provisional application No. 61/412,606, filed on Nov. 11, 2010.

(51) Int. Cl.
*G06F 15/18* (2006.01)
*G06F 17/00* (2006.01)
*G06N 5/02* (2006.01)
*G06N 3/00* (2006.01)
*G06N 99/00* (2010.01)

(52) U.S. Cl.
CPC .............. *G06N 3/008* (2013.01); *G06N 99/005* (2013.01); *Y10S 706/903* (2013.01)
USPC ................... 706/14; 706/48; 706/903

(58) Field of Classification Search
CPC ..... G06N 3/008; G06N 99/005; G06N 5/003; G05B 13/00; G05B 2219/33056; G06D 1/0088; B25J 11/0005; B25J 11/001
USPC .................. 706/12, 14, 45, 48, 903
See application file for complete search history.

(56) References Cited

U.S. PATENT DOCUMENTS

| | | | | |
|---|---|---|---|---|
| 6,353,814 | B1* | 3/2002 | Weng | 706/12 |
| 2002/0156751 | A1* | 10/2002 | Takagi et al. | 706/12 |
| 2004/0243281 | A1* | 12/2004 | Fujita et al. | 700/245 |
| 2006/0129506 | A1* | 6/2006 | Edelman et al. | 706/12 |
| 2008/0066065 | A1* | 3/2008 | Kim et al. | 718/1 |
| 2008/0091628 | A1* | 4/2008 | Srinivasa et al. | 706/12 |
| 2008/0306627 | A1* | 12/2008 | Lee et al. | 700/245 |
| 2009/0254236 | A1* | 10/2009 | Peters, II | 701/28 |
| 2010/0042401 | A1* | 2/2010 | Ascoli et al. | 704/9 |
| 2010/0094786 | A1* | 4/2010 | Gupta et al. | 706/12 |

OTHER PUBLICATIONS

Brooks, A.G. "Coordinating Human-Robot Communication", Dissertation, Massachusetts Institute of Technology, Feb. 2007. 210 pages.*

(Continued)

*Primary Examiner* — Jeffrey A Gaffin
*Assistant Examiner* — Benjamin Buss
(74) *Attorney, Agent, or Firm* — Tope-McKay & Associates

(57) ABSTRACT

The present invention relates to a system for mapping external inputs and internal goals toward actions that solve problems or elicit external rewards. The present invention allows an instructor to test and train an agent to perform dynamic task selection (executive control) by using a schema that computes the agent's emotional and motivational states from reward/punishment inputs and sensory inputs (visual, auditory, kinematic, tactile, olfactory, somatosensory, and motor inputs). Specifically, the invention transforms the sensory inputs into unimodal and bimodal spatio-temporal schemas that are combined with the reward/punishment inputs and with the emotional and motivation states to create an external/internal schema (EXIN schema), that provides a compressed representation assessing the agent's emotions, motivations, and rewards. The invention uses the EXIN schema to create a motor schema to be executed by the agent to dynamically perform the task selected by the instructor.

36 Claims, 13 Drawing Sheets

(56) References Cited

OTHER PUBLICATIONS

Folgheraiter, M. et al. "A BioInspired Neural Controller for a Mobile Robot". Proceedings of the 2006 IEEE International Conference on Robotics and Biomimetics, Dec. 17-20, 2006. pp. 1646-1651.*

Montague P. Dayan P, Sejnowski T (1996), A framework for mesencephalic dopamine systems based on predictive Hebbian learning, J. Neurosci. 16:1936-1947.

Nadel, L, Moscovitch, M. (1997). Memory consolidation, retrograde amnesia and the hippocampal complex, Current Opinion in Neurobiology, 7:217-227.

Pascual-Leone, A., Grafman, J. and Hallett, M. (1995). Procedural learning and the prefrontal cortex. In: Grafman, J., Holyoak, K.J. and Boller, F. (Editors). Structure and Function of the Human Prefrontal Cortex. New York: Annals of the New York Academy of Sciences, 769:61-70.

Pascual-Leone A, Wassermann EM, Grafman J, Hallett M. (1996). The role of the dorsolateral prefrontal cortex in implicit procedural learning. Exp Brain Res. 107:479-85.

Pandya, D.N. and Barnes, C.L. (1987). Architecture and connections of the frontal lobe. In: The Frontal Lobes Revisited, (Ed.) E. Perecman, IRBN, N.Y. 41-72.

Porrino, L.J., Crane, A.M., Goldmanrakic, P.S. (1981). Direct and indirect pathways from the amygdala to the frontal-lobe in rhesus-monkeys, Journal of Comparative Neurology 198, 121-136.

Quintana, J. and Fuster J. (1992). Mnemonic and predictive functions of cortical neurons in a memory task, NeuroReport 3:721-724.

Rhodes, B. and Bullock, D. (2002). Neural dynamics of learning and performance of fixed sequences: Latency pattern reorganizations and the N-Streams model, Boston University Technical Report CAS/CNS-02-005. Submitted for publication.

Rhodes, B.J., Bullock, D., Verwey, W.B., Averbeck, B.B., and Page, M.P.A. (2004). Learning and production of movement sequences: Behavioral, neurophysiological, and modeling perspectives, Human Movement Science 23, pp. 683-746.

Seltzer, B. and Pandya, D.N. (1989). Intrinsic connections and architectonics of the superior temporal sulcus in the rhesus monkey. Journal of Comparative Neurology 290:451-471.

Srinivasa, N., and Chelian, S.E. (2007). SET-APART: Spectral separation ART with hippocampal dynamics for novelty detection. In Proceedings of the International Conference on Cognitive and Neural Systems (ICCNS 2007), Boston, USA, Abstract. 1 page.

Teyter, T, Discenna, P. (1985). The role of hippocampus in memory, a hypothesis. Neurosci & Biobehav. Reviews 9:377-389.

Teyler, T. J., & Discenna, P. (1986). The hippocampal memory indexing theory, Behavioral Neuroscience, 100:147-154.

Wagner AD. (1999). Working memory contributions to human learning and remembering, Neuron 22:19-22.

Zhang, H., et al. (1999). A parallel distributed processing model of stimulus-stimulus and stimulus-response compatibility. Cognit. Psychol. 38:386-432.

Aggleton, J. P., (1993). The contribution of the amygdala to normal and abnormal emotional states, Trends of Neurosciences, 16:328-333.

Amoral, D.G., Price, J. L. (1984), Amygdalo-cortical projections in the monkey (Macaca fascicularis), Journal of Comparative Neurology, 230:465-496.

Arbib, M.A., Rizzolatti, G. (1997). Neural expectations: a possible evolutionary path from manual skills to language, Communication and Cognition, 29:393-424.

Banquet, J., Gaussier, P., Quoy, M. Revel, A. Burnod, Y. (2005). A Hierarchy of Associations in Hippocampo-Cortical Systems; Cognitive Maps and Navigation Strategies, Neural Computation 17:1339-1384.

Barbas, H., Pandya, D. (1987). Architecture and frontat cortical connections of the premolor cortex (area 6) in the rhesus monkey. Journal of comparative neurology 256:211-228.

Barbas H. and Pandya, D. (1991). Pattern of Connections of the Prefrontal Cortex in the Rhesus Monkey Associated with Cortical Architecture. In: Frontal Lobe Function and Injury., H.S. Levin, H.M. Eisenberg and A. Benton (Eds.), Oxford Univ. Press; Cambridge, pp. 34-58.

Barch, D, Braver, T. Sabb, F, Douglas C, Noll, D. (2000). Anterior Cingulate and the Monitoring of Response Conflict: Evidence from an fMRi Study of Overt Verb Generation. Journal of Cognitive Neuroscience, 12:298-309.

Barone P. Joseph JP. (1989). Prefrontal cortex and spatial sequencing in macaque monkey, Exp. Brain Res, 78:447-64.

Bates J. Goldman-Rakic, P. (1993). Prefrontal connections of medial motor areas in the rhesus monkey, Journal of comparative neurology, 336:211-228.

Berger TW, Berry SD, Thompson RF (1966) Role of the hippocampus in classical conditioning of aversive and appetitive behaviors. In: The hippocampus, (Isaacson, RL, Pribram, KH, eds), vol. 4. p. 203-239, New York: Plenum.

Botvinick, M., Braver, T., Barch, D. Carter, C. Cohen, J. (2001). Conflict monitoring and cognitive control, Psychological Review, 108:624-652.

Bradski, G. and S. Grossberg (1995), Fast learning VIEWNET architectures for recognizing 3-D, objects from multiple 2-D views, Neural Networks 8:1053-1080.

Brown. J., Bullock. D., & Grossberg, S., (2004). How laminar frontal cortex and basal ganglia circuits interact to control planned and reactive saccades, Neural Networks, 17:471-510.

Bullock, D., S. Grossberg, et al. (1993). A self-organizing neural model of motor equivalent reaching and tool use by a multijoint arm, Journal of Cognitive Neuroscience, 5:408-435.

Carpenter, G.A., and Grossberg, S. (1987). Neural dynamics of category learning and recognition: Attention, memory consolidation, and amnesia. In J. Davis, R. Newburgh, and E. Wegman (Eds.). Brain structure, learning, and memory. Westview Press, 233-290.

Carpenter, G.A., Grossberg, S., Markuzon N., Reynolds, J.H., and Rosen, D.B. (1992). Attentive supervised learning and recognition by an adaptive resonance system. In G.A. Carpenter and S. Grossberg (Eds.), Neural networks for vision and image processing . Cambridge, MA : MIT Press, pp. 365-384.

Carter, C. S., Braver, T. S., Barch, D. M., Botvinick, M. M., Noll, D., & Cohen, J. D. (1998). Anterior cingulate cortex, error detection, and the online monitoring of performance. Science, 280, 747-749.

Chavis, D. and Pandya, D.N (1976). Further observations on corticofrontal connections in the rhesus monkey, Brain Research 117:369-386.

Cohen JD, Servan-Schreiber D. (1992). Context, cortex and dopamine: a connectionist approach to behavior and biology in schizophrenia. Psychol. Rev. 99:45-77.

Gerfen, C. (1992) The neostriatal mosaic: Multiple levels of compartmental organization in the basal ganglia, Ann. Rev. Neurosci, 15:285-320.

Gnadt, W. and Groasberg, S. (2008). SOVEREIGN: An autonomous neural system for incrementally learning planned action sequences to navigate towards a rewarded goat, Neural Networks, 21:699-758.

Goldman PS, Nauta WJ. (1976). Autoradiographic demonstration of a projection from prefrontal association cortex to the superior colliculus in the rhesus monkey. Brain Res. 116:145-49.

Gomez Beldarrain et al (2002). Prefrontal lesions impair the implicit and explicit learning of sequences on visuomotor tasks, Experimental Brain Research, 142: 529-538.

Grossberg, S., and Merrill, J.W.L., (1992). A Neural Network Model of Adaptiveiy timed Reinforcement Learning and Hippocampal Dynamics, Cognitive Brain Research, 1:3-38.

Grossberg, S. and Merrill. J.W.L., (1996). The hippocampus and cerebellum in adaptively timed learning, recognition, and movement. Journal of Cognitive Neuroscience, 8:257-277.

Grossberg, S. and Pearson. L. (2008). Laminar cortical dynamics of cognitive and motor working memory, sequence learning and performance: Toward a unified theory of how the cerebral cortex works, Psychological Review, 115:677-732.

Grossberg, S. and Repin, D. (2003). A neural model of how the brain represents and compares multi-digit numbers: Spatial and categorical processes. Neural Networks 16:1107-1140.

(56) References Cited

OTHER PUBLICATIONS

Guenther, F.H., Bullock, D., Greve, D., and Grossberg, S. (1994). Neural representations for sensory-motor control, III: Learning a body-centered representation of 3-D target position, Journal of Cognitive Neuroscience, 6:341-358.
Jenkins IH, Brooks DJ, Nixon PD, Frackowiak RSJ, Passingham RE, (1994), Motor sequence learning: A study with positron emission tomography. J. Neuroscience,14:3775-3790.
Jones EG, Powell TP. (1970). An anatomical study of converging sensory pathways within the cerebral cortex of the monkey. Brain 93:793-820.
Jueptner M, Stephan KM, Frith CD, Brooks DJ. Frackowiak RSJ, Passingham RE. (1997), The anatomy of motor learning. I. The frontal cortex and attention to action, J. Neurophysiol, 77:1313-1324
Jueptner M, Frith CD, Brooks DJ, Frackowiak RSJ, Passingham RE. (1997). The anatomy of motor learning. II. Subcortical structures and learning by trial and error, J. Neurophysiol, 77:1325-1337.
Kornblum, S. (1994). The way irrelevant dimensions are processed depends on what they overlap with: The case of Stroop- and Simon-like stimuli, Psychol. Res./Psychol, Forsch, 56.130-135.
Kornblum, S., et al. (1990). Dimensional overlap: Cognitive basis far stimulus-response compatibility: A model and taxonomy, Psychol. Rev. 97:253-270.
MacDonald AW, Cohen JD, Stenger VA, & Carter CS (2000). Dissociating the role of dorsolateral prefrontal cortex and anterior cingulate cortex in cognitive control, Science 288:1835-1837.
Miller EK. (1999). The prefrontal cortex: complex neural properties for complex behavior, Neuron 22:15-17.
Miller EK & Cohen JD (2001). An integrative theory of prefrontal cortex function, Annual Review of Neuroscience, 24:167-202.
Nadel, L. iMioscovitch I. (2001). The hippocampal complex and long-tem memory revisited: Trends in Cognitive Sciences, 5:228-230.
Petrides, M. (1995). Impairments on nonspatial self-ordered and externally ordered working memory tasks after lesions of the mid-dorsal part of the lateral frontal cortex in the monkey. J Neurosci 15:359-375.
Sakai, K., Okihide, H., Miyauchi, S., Takino, R, Sasaki, Y., and Pütz, B. (1998). Transition of Brain Activation from Frontal to Parietal Areas in Visuomotor Sequence Learning, The Journal of Neuroscience 18:1827-1840.
Sarnsonovich, A. V. and Ascoli, G. A. (2005). A simple neural network model of the hippocampus suggesting its pathfinding role in episodic memory retrieval. Learning & Memory 12:193-208.
Sohoenbaurn, G., Setlow, B, Saddoris, M. P., and Gallagher, M., (2003), Encoding predicted outcome and acquired value in orbitofrontal cortex during cue sampling depends upon input from basolateral amygdala. Neuron, 39:855-867.
Smith EE, Jonides J. (1999). Storage and executive processes in the frontal lobes. Science 283:1657-61.
Suri R, Schultz W (1998). Learning of sequential movements by neural network model with dopamine-like reinforcement signal. Exp. Br, Res. 121350-354.
Ungerleider, L., Courtney, S., and Haxby, J. (1998) A Neural System for Human Visual Working Memory, Proceedings of the National Academy of Sciences, 95:883-890.
Van Hoesen GW, Pandya DN, Butlers N (1972). Cortical afferents to the entorhinal cortex of the rhesus monkey, Science 175:1471-1473.
Vogt, B, Finch DM, Olson CR. (1992), Functional heterogeneity in cingulate cortex: the anterior executive and posterior evaluative regions, Cerebral Cortex, 2:435-443.

Arbib, M.A., (2005) From Monkey-like Action Recognition to Human Language: An Evolutionary Framework for Neurolinguistics (with commentaries and author's response), Behavioral and Brain Sciences. 28:105-187.
Baxter, M.G., Parker, A., Lindner, C.C.C, Izquiredo, A.D., Murray, E. A., (2000). Control of response selection by reinforcer interaction of amygdala and orbital prefrontal cortex. Journal of Neuroscience, 20: 4311-4319.
Botvinick, M., Nystrom, L., Fissell, K, Carter, C. Cohen, J. (1999), Conflict monitoring vs. selection-for-action in anterior cingulate cortex, Nature, 402:179-181.
Brog J, Salyapongse A, Deutch A, Zahm D (1993). The patterns of afferent innervation of the core and shell in the "accumbens" part of the rat ventral striatum: immunonistochemical detection of retrogradely transported fluoro-gold, J. Comp. Neurol. 338: pp. 255, 258-278.
Brown, J., Bullock. D., and Grossberg. S. (1999). How the basal ganglia use parallel excitatory and inhibitory learning pathways to selectively respond to unexpected rewarding cues, Journal of Neuroscience, 19:10502-10511.
Cohen: J. D., Botvinick, M., & Carter. C. S. (2000). Anterior cingulate and prefrontal cortex: Who's in control?, Nature Neuroscience, 3:421-423.
Gorchetchnikov, A. and Grossberg, S. (2007) Space, time, and learning in the hippocampus: How fine stiatial temporal scales are expanded into population codes for behavioral control. Neural Networks, 20:182-93.
LeDoux JE (2002) Emotion, Memory and the Brain. Sci Am 12:62-71.
Miller EK, Erickson CA, Desirnone R. (1996). Neural mechanisms of ual working memory in prefrontal cortex of the macaque. J. Neurosci. 16:5154-5167.
O'Keefe, J., & Nadel, L. (1979) Precis of O'Keefe and Nadel's The hippocampus as a cognitive map, and Author's Response to Commentaries. Behavioral Brain Scence, 2: 487-534.
Nolde, S. Johnson. M. Raye, C. (1998). The role of prefrontal cortex during testd of epidodio memory, Trends in Cognitive Sciences, 2:399-406.
Petrides, M. (1991) Functional Specialization within the Dorsolateral Frontal Cortex for Serial Order Memory, Biological Sciences, 20:299-306.
Schultz W, Dayan P, Montague P (1997). A neural substrate of prediction and reward. Science 275:1893-1898.
Ungerleider, L. G. (1995). Functional brain imaging studies of cortical mechanisms for memory, Science 270, 769-775.
Arnsten, A. (1998). Catecholamine modulation of prefrontal mubcal ccignitiye function, Trends in Cognitive Sciences, 2:436-447.
Brog J, Salyapongse A, Deutch A, Zahm D (1993). The patterns of afferent innervation of the core and shell in the "accombens" part of the rat ventral striatum: immunoldlochemical detection of retrogradely transported fluoro-gold, J. Comp. Neurol 336:255-78.
Carter, C. S., MacDonald A. M. III, Botvinick M., Stenger V. A. & Cohen, J. D. (2000). Parsing executive processes: Control vs. evaluation in the frontal cortex, Biological Psychiatry. 346, 104S.
Fuster, J. (2000). Prefrontal neurons in networks of executive memory. Brain Research Bulletin, 52:331-336.
Grossberg, S., and Schmajuk. N. A., (1987). Neural Dynamics of attentionally-modulated Pavlovian conditioning Conditioned reinforcement, inhibition and opponent processing. Psychobiology, 15:195-240.

* cited by examiner

| | |
|---|---|
| Description | The purpose of this task is to test integrated vision, language, navigation, and possibly manipulation. In the actual task, an agent will be placed in a room, shown an object, and asked to find a copy in another room. Verbal hints and constraints may be given to the agent. A detailed breakdown of the task is given below:<br>1. Agent and instructor initiate contact.<br>2. Instructor gives instructions and constraints/hints (e.g., avoid red rooms/seek green rooms).<br>3. Agent enters new room:<br>   a. Agent may search room or use as a path to new room.<br>   b. Agent searches room.<br>      i. Objects examined and match determined.<br>      ii. Agent either finds object or decides object is not present.<br>4. Agent exits room.<br>5. Agent retrieves object or reports failure.<br>6. Repeat N times.<br>Possible increased complexity might come from:<br>1. Moving targets.<br>2. Similarity of target and foils increase.<br>3. Target cannot be visually discriminated from foils (e.g., must pick objects and determine their weight).<br>4. Search object differs from target specifications.<br>5. Increased complexity of rooms.<br>6. Changes in map layout/path structure (e.g., doors locked) |
| Assumed Scenario Structure | 1. Initialization<br>   TICA wakes up, sees the instructor, and an empty table.<br>   The instructor places an item on the table and says, "Look here, find an egg."<br>   "Egg" can be replaced by any noun/noun phrase in other trials.<br>2. Search<br>   The instructor takes the item off the table.<br>   TICA searches for and retrieves the item; then it says "I found an egg." |

FIG. 6

| | |
|---|---|
| TICA wakes up, sees the instructor, and an empty table<br>⇒ TICA idly scans the room, instructor, and table | Here, the "Explore" drive will win when no other drive is active. This drive state along with the sensory state of the room will create a new EXIN node. Because no motor schemas are active "top down" (i.e., from LPFC), DLPFC will learn to chunk the saccades created between salient points.<br>After several uneventful saccades (assuming the table and instructor do not induce a change in drives or reward or drastically different sensory context), the same EXIN node will be weakly connected to several saccade motor schemas. Enacting each motor schema will require the interplay of Pre-SMA, SMA, M1, BG, and spinal circuits as detailed in the motor schema description. | AC → WA/MT → LPFC, auditory<br>LPFC, auditory → AM<br>AM → OMPFC |
| Instructor then places an item on the table and says, "Look here, find this egg." After a brief moment, the instructor takes the item off the table.<br>⇒ TICA attends to and stores the item. | The placement of the item on the table creates a salient point (due to motion), and TICA will saccade to it.<br>When the instructor says, "Look here..." the "Please instructor" drive will be turned on (see "Assumptions"). This will create a new EXIN node, shutting off support to the currently active saccade node.<br>This EXIN node will shut off support to the previously winning saccade motor schema in DLPFC and a new episodic memory will be selected in OLPFC. | |

FIG. 7

| | | | |
|---|---|---|---|
| TICA searches for the item.<br>=> TICA will saccade, turn its head, and locomote until it finds the item. | | | |
| After the item was removed from the table, a saliency map of egg-like objects will be created in the Superior Colliculus of TICA. | HC (AS→ASC) → HT (LH) → PPTN → SNc → VA THAL → OLPFC. | | |
| If the object is not the egg, then there will be a mismatch generated in IT. Repeated mismatches from the Arousal System Counter in the HC will cause a negative reward to arrive at OLPFC via HT and BG. | | | |
| In this case, a new EXIN node will be selected, shutting off support to the currently active M. A new M will be selected based on energy expenditure and habituative constraints (e.g., after saccading a long while, even though it consumes the least energy, head rotations are chosen). (These habituative dynamics are like those found in SPAN, where certain M's habituate slower but recover more quickly.) This will be played out in PMC and M1.<br>The most active EXIN node will condition onto the M. These M's in turn will represent TPV□PPV conversions that the DLPFC has chunked. Note that the Arousal System has a counter for resets of PC and another for that of TC. The vigilance of TC is higher than that found in PC so that mismatch of features cause more resets than mismatch of locations. | OPLFC → DLPFC → PMC → M1 | | |
| If the object is the egg, then there will be a match generated in IT. By the assumption, TICA will say "I found it." This is a conditioned reinforcer to the "Ignore instructor" drive, and a new M will be selected given a new EXIN node. Please note that the "Ignore instructor" drive does not have any reverberation, the "Explore" drive will win again and TICA will saccade idly about. | | | |

FIG. 8

METHOD AND SYSTEM FOR DYNAMIC TASK SELECTION SUITABLE FOR MAPPING EXTERNAL INPUTS AND INTERNAL GOALS TOWARD ACTIONS THAT SOLVE PROBLEMS OR ELICIT REWARDS

PRIORITY CLAIM

This is a Non-Provisional application of U.S. Provisional Application No. 61/412,606, filed on Nov. 11, 2010, and entitled, "METHOD AND APPARATUS FOR DYNAMIC TASK SELECTION SUITABLE FOR MAPPING EXTERNAL INPUTS AND INTERNAL GOALS TOWARD ACTIONS THAT SOLVE PROBLEMS OR ELICIT EXTERNAL REWARDS."

BACKGROUND OF THE INVENTION (1) Technical Field

The present invention relates to the fields of cognitive psychology, biology, neural science, signal processing, neural networks, executive control, and computer science and, more specifically, to a system, method, and computer program product for dynamic task selection (executive control) suitable for mapping external inputs and internal goals toward actions that solve problems or elicit external rewards.

(2) Description of Related Art

Executive control is generally defined as the ability (of a person or an agent) to map external inputs and internal goals toward actions that solve problems or elicit rewards. That is, if a reward is gained by finding a goal object (such as an improvised explosive device (IED) or requested tool), then executive control must move a platform's sensors across its surroundings, potentially change those surroundings by locomotion, recognizing the goal object among potential distractions and clutter, and finally retrieve the object, all in a goal-direction fashion. Henceforth, the terms "executive control," "dynamic task selection," "decision making," and "developing and refining reward-eliciting behaviors," are generally used interchangeably.

Some examples of algorithms that use executive control include goal programming or adaptive search algorithms. Examples of applications for decision making vary from academic (e.g., Stroop Test, Wisconsin Card Sorting Task, or Towers of Hanoi) to applied (e.g. modeling of consumer decision making, medical diagnosis, command and control, modeling of human problem solving under stressful situations, and autonomous assembly robots).

In recent years, several bio-inspired methods for executive control have been reviewed, such as those discussed in "An Integrative Theory of Prefrontal Cortex Function", *Animal Review of Neuroscience, vol.* 24, 2001, pp. 167-202 by E. K. Miller and J. D. Cohen. Recently there have also been several executive control architectures inspired by cognitive psychology (e.g. SOAR, ACT-R, etc.). In addition, it has been proven biologically that executive control is partly served by the Pre-Frontal Cortex (PFC). However, these previous bio-inspired methods for executive control typically only use simple inputs or limit themselves to a small subset of PFC functions. Another disadvantage of previous executive control architectures (inspired by cognitive psychology) is that they do not consider any detailed anatomical or physiological constraints.

Therefore, a system for executive control is needed that is inspired by both, cognitive psychology and biology, that uses and takes advantage of complex inputs, of a large subset of PFC functions, of detailed anatomical constraints, and of detailed physiological constraints, and which is time efficient and is versatile in its implementation and integration into larger scale systems and level applications.

The present invention provides a solution for "executive control" or "dynamic task selection" that uses components of previous models, particularly those of ARTSTORE, DIRECT, N-STREAMS, TELOS previously discussed in "Fast Learning VIEWNET Architectures for Recognizing 3-D Objects from Multiple 2-D Views", *Neural Networks*, vol. 8, 1995, pp. 1053-1080 by G. Bradski, and S. Grossberg, discussed in "How Laminar Frontal Cortex and Basal Ganglia Circuits Interact to Control Planned and Reactive Saccades", *Neural Network*, vol. 17, 2004, pp. 471-510 by in J. Brown, D. Bullock, and S. Grossberg, discussed in "A Self-Organizing Neural Model of Motor Equivalent Reaching and Tool Use by a Multijoint Arm", *Journal of Cognitive Neuroscience*, vol. 5, 1993, pp. 408-435 by D. Bullock, and S. Grossberg, discussed in "Neural Dynamics of Attentionally-Modulated Pavlovian Conditioning: Conditioned Reinforcement, Inhibition and Opponent Processing", *Psychobiology*, vol. 15, 1987, pp. 195-240 by S. Grossberg and N. A. Schmajuk, and discussed in "Neural Dynamics of Learning and Performance of Fixed Sequences: Latency Pattern Reorganizations and the N-STREAMS Model", Boston University Technical Report CAS/CNS-02-005, Boston, Mass., United States, 2002 by B. Rhodes and D. Bullock.

However, the currently presented solution for executive control organizes those components in novel ways, while also addressing many more anatomical and physiological constraints than the previous bio-inspired or cognitive psychology-based executive control models. The method and system for executive control are based on a review of the structure and function of the mammalian prefrontal cortex (PFC). As a result, the executive control system and model provide a biologically plausible architecture that learns from and uses multimodal spatio-temporal working memories to develop and refine reward-eliciting behaviors. This model is defined by differential equations with timing constraints, and the implementation of the executive control model can be carried out on a serial digital computer (e.g. Von Neumann) or on a parallel analog computer (e.g. Analog Pulse Processing computer). Therefore, the model and consequently the system are time efficient and versatile in their implementation and integration into larger scale systems and level applications.

An additional advantage of the present method and system for "executive control" or "dynamic task selection" is that the model can be used with any algorithm requiring dynamic task selection or as part of a larger systems-level application. Therefore, the solution for executive control can also find applications in other executive control systems at large scales including multi-agent simulation.

Furthermore, since the present invention is as an all-software solution, the present solution for executive control can be easily and efficiently integrated into any system requiring decision making systems, such as systems for: modeling of consumer decision making; medical diagnosis: command and control; modeling of human problem solving, especially under stressful situations; and autonomous assembly robots.

For the foregoing reasons, there is a great need for a system for dynamic task selection (executive control) suitable for mapping external inputs and internal goals toward actions that solve problems or elicit external rewards, wherein the system is inspired by cognitive psychology and biology, which allows the system to use and take advantage of complex inputs, of a large subset of PFC functions, of detailed anatomical constraints, and of detailed physiological constraints, and allows the system to be time efficient and versatile in its implementation and integration into larger scale systems and level applications.

SUMMARY OF THE INVENTION

The present invention provides a system, a method, and a computer program product that overcome the aforementioned limitations and fill the aforementioned needs by providing a system and a method inspired by cognitive psychology and biology for dynamic task selection (executive control) suitable for mapping external inputs and internal goals toward actions that solve problems or elicit external rewards, wherein the present system uses and takes advantage of complex inputs, of a large subset of PFC functions, of detailed anatomical constrains, and of detailed physiological constraints, while at the same time the system is time efficient and versatile in its implementation and integration into larger scale systems and level applications.

In an aspect of the invention, a system for dynamic task selection (executive control) suitable for mapping external inputs and internal goals toward actions that solve problems or elicit external rewards, is presented. In this aspect, the system comprises a processor, an input coupled with the processor for receiving a plurality of inputs to be processed into a motor-schema, and a memory coupled with the processor, wherein the memory includes instruction means that are executable by the processor for causing the processor to perform a plurality of operations. Initially, the system performs the operations of receiving sensory inputs, transforming the sensory inputs into clusters of spatial patterns, and transforming the clusters of spatial patterns into a spatial schema. Then, the system encodes the transitions between the spatial schema, and next clusters the spatial schema and encoded spatial schema transitions into a spatio-temporal schema, wherein the spatio-temporal schema is subsequently combined with the spatial schema to create a bimodal spatio-temporal schema. Next, the system receives a reward input and a punishment input, wherein the reward input and the punishment input reflect a current state of an external environment. Then, the system uses these reward input and punishment input to compute an emotional state and a motivational state by combining the sensory inputs with the reward input and the punishment input.

In this aspect, the system further combines the bimodal spatio-temporal schema with the reward input, the punishment input, the emotional state, and the motivational state to create an external/internal schema (EXIN schema), wherein the EXIN schema provides a compressed representation assessing emotions, motivations, and rewards. The system then combines the EXIN schema with the bimodal spatio-temporal schema to create a multimodal spatio-temporal schema, wherein the multimodal spatio-temporal schema serves as an episodic memory that can be replayed by the system. Next, the system receives structures representing a plurality of elements of a motor system and subsequently combines the multimodal spatio-temporal schema with the motor system structures and the EXIN schema to create a motor schema.

In another aspect of the present invention, a system performs in two distinct modes, a training mode and a testing mode, wherein in the training mode, the created motor schema represents a learnt motor schema associated with emotional and motivational-drive context derived from the EXIN schema following a bottom-up input hierarchy, and the system stores the learnt motor schema for future use. In this aspect of the invention, when the system performs in the testing mode, the created motor schema indicates how to perform a particular action, and the system feeds back the EXIN schema to be combined with the spatial schema and the spatio-temporal schema to create a top-down bimodal spatio-temporal schema, and then the system sends the created motor schema to the motor system to perform a particular action.

In a further aspect of the present invention, the system further comprises an agent to be trained to perform dynamic task selection, an instructor for providing a task to the agent to perform, and a data base of motor schemas that fulfill a plurality of tasks to be selected by the instructor. In this aspect, the system receives from the instructor a desired task to be performed by the agent, and then the system selects from the data base a desired motor schema that fulfills the desired task received from the instructor. Next, the system executes the motor schema created by the system and compares a difference measurement between the executed motor schema and the desired motor schema that fulfills the desired task received from the instructor.

In this aspect, the system computes a progress measurement of the agent from the reward input and the schema difference measurement, wherein the progress measurement increases as the executed motor schema gets closer to the desired motor schema and closer to achieving the desired task, and wherein the progress measurement decreases as the executed motor schema gets farther away from the desired motor schema.

Furthermore, in this aspect, the system generates a reward signal when the progress measurement increases, indicating that the agent is closer to achieve the desired task, in addition to the system keeping a count of the number of reward signals generated by the system in order to compute a reward frequency associated with the created motor schema. Next, the system generates a punishment signal when the progress measurement decreases, indicating that the agent is not achieving the desired task.

In a further aspect of the invention, the system keeps a count of number of punishment signals generated by the system, and the system feeds back the reward signal and punishment signal to be inputted into the system as a reward input and a punishment input, respectively.

In still another aspect, the system receives a mismatch threshold from the instructor, compares this mismatch threshold with the count of punishment signals, and generates a mismatch reset signal when the count of punishment signals exceeds the mismatch threshold. Then, the system sends the mismatch reset signal to the multimodal pre-processor, wherein mismatch reset signal forces the multimodal pre-processor to deselect the EXIN schema and to create a new EXIN schema. Next, the system sends the mismatch reset signal to the motor system to shut-off motor channels and stop the motor system from performing the particular action being performed.

Another aspect of the invention is a system that combines the sensory inputs with the count of reward signals to create a reset toggle signal when the count of reward signals is drastically reduced or the sensory inputs reflect significantly changed emotional states. Then, the system sends the reset toggle signal to the multimodal pre-processor, wherein reset toggle signal forces the multimodal pre-processor to stop creating the EXIN schema, and next the system sends this reset toggle signal to the motor system to shut-off motor channels and stop the motor system from performing actions.

In an aspect of the present invention, a system for dynamic task selection receives a success threshold from the instructor and uses the count of reward signals to compute the reward frequency associated with the executed motor schema. Next, the system compares the success threshold with reward frequency of the executed motor schema and stores the executed motor schema as a habit or skill when the reward frequency meets the success threshold required by the instructor.

In a further aspect of the invention, the system further uses the reward input as an enticing reset signal when the punishment input has a high value, whereby the enticing reset signal forces the system to deselect the EXIN schemas and continue creating new EXIN schemas despite the high value of the punishment input.

In another aspect of the invention, the system calculates a set of statistics reflecting primacy/recency, frequency of occurrence, and reward and punishment associated with the biomodal spatio-temporal schema, with the multimodal spatio-temporal schema, and with the motor schema. Then, the system analyzes the set of statistics to resolve conflicts generated by a suddenly changing desired task or suddenly changing sensory inputs. Next, the system creates a conflict resolution signal based on the set of statistics, wherein the conflict resolution signal selects, to be processed, schemas that are more frequently executed and that have high reward signals associated with the schemas, and also selects to be processed schemas that are more recently executed than older schemas.

In still another aspect, the system creates the EXIN schema by further combining the spatio-temporal schema with the bimodal spatio-temporal schema, the reward input, the punishment input, the emotional state, and the motivational state. Next, the system creates the motor schema by further combining the spatial schema and the bimodal spatio-temporal schema with the multimodal spatio-temporal schema, the motor system structures, and the EXIN schema.

Furthermore, the system in this aspect selects the sensory inputs from a group consisting of: visual inputs, auditory inputs, kinematic inputs, tactile inputs, olfactory inputs, somatosensory inputs, and motor inputs.

In yet another aspect of the present invention, the operations performed by the system and by the processor within the system are defined by differential equations with timing constraints that are implemented on a serial computer or on a parallel Analog Pulse Processing computer.

In still another aspect, the EXIN schema corresponds to compressed representations of an EXternal motivator and INternal states and the motor schema corresponds to a sequence of joint rotations, where space corresponds to the joint rotations and time corresponds to a course taken by the joint rotations along the particular action.

In a further aspect of the invention, the EXIN schemas, the motor schemas, and the spatio-temporal schemas are encoded and recognized via a spatio-temporal algorithm selected from a group consisting of: hARTSTORE network, HTM, SOC, and DBN.

Yet still another aspect of the present invention comprises a computer implemented method for dynamic task selection (executive control) suitable for mapping external inputs and internal goals toward actions that solve problems or elicit external rewards. In this aspect, the method comprises an act of causing a processor to perform operations of: receiving sensory inputs; transforming the sensory inputs into clusters of spatial patterns; transforming the clusters of spatial patterns into a spatial schema; encoding transitions between the spatial schema: clustering the spatial schema and encoded spatial schema transitions into a spatio-temporal schema; and combining the spatial schema with the spatio-temporal schema to create a bimodal spatio-temporal schema.

In this aspect, the method further causes the processor to perform the operation of receiving a reward input and a punishment input, wherein the reward input and the punishment input reflect a current state of an external environment. Next, the method causes the processor to perform the operation of computing an emotional state and a motivational state from the sensory inputs, the reward input, and the punishment input. Subsequently, the method causes the processor to perform the operation of combining the bimodal spatio-temporal schema with the reward input, the punishment input, the emotional state, and the motivational state to create an external/internal schema (EXIN schema), wherein the EXIN schema provides a compressed representation assessing emotions, motivations, and rewards.

Furthermore, in this aspect, the method causes the processor to perform the operation of combining the EXIN schema with the bimodal spatio-temporal schema to create a multimodal spatio-temporal schema, wherein the multimodal spatio-temporal schema serves as an episodic memory that can be replayed by the computer implemented method. Next, the method causes the processor to perform the operation of receiving structures representing a plurality of elements of a motor system, and the operation of combining the multimodal spatio-temporal schema with the motor system structures and the EXIN schema to create a motor schema.

In another aspect of the present invention, a computer implemented method behaves in two distinct modes, a training mode and a testing mode, wherein in the training mode, the created motor schema represents a learnt motor schema associated with emotional and motivational-drive context derived from the EXIN schema following a bottom-up input hierarchy, and the method causes the processor to perform the operation of storing the learnt motor schema for future use. In this aspect of the invention, when the method performs in the testing mode, the created motor schema indicates how to perform a particular action, and the method further causes the processor to perform the operation of feeding back the EXIN schema to be combined with the spatial schema and the spatio-temporal schema to create a top-down bimodal spatio-temporal schema, and then the method causes the processor to perform the operation of sending the created motor schema to the motor system to perform a particular action.

In a further aspect of the present invention, a computer implemented method is used by an agent to be trained to perform dynamic task selection along with an instructor that provides a task to the agent to perform, and wherein the method uses a data base of motor schemas that fulfill a plurality of tasks to be selected by the instructor. In this aspect, the method causes the processor to perform the operation of receiving from the instructor a desired task to be performed by the agent, and then the method causes the processor to perform the operation of selecting from the data base a desired motor schema that fulfills the desired task received from the instructor. Next, the method causes the processor to perform the operations of executing the motor schema created by the method and comparing a difference measurement between the executed motor schema and the desired motor schema that fulfills the desired task received from the instructor.

In this aspect, the method further causes the processor to perform the operation of computing a progress measurement of the agent from the reward input and the schema difference measurement, wherein the progress measurement increases as the executed motor schema gets closer to the desired motor schema and closer to achieving the desired task, and wherein the progress measurement decreases as the executed motor schema gets farther away from the desired motor schema.

Furthermore, in this aspect, the method causes the processor to perform the operation of generating a reward signal when the progress measurement increases, indicating that the agent is closer to achieve the desired task, in addition to the method keeping a count of the number of reward signals generated by the system in order to compute a reward frequency associated with the created motor schema. Next, the method causes the processor to perform the operation of generating a punishment signal when the progress measurement decreases, indicating that the agent is not achieving the desired task.

In a further aspect of the invention, the method causes the processor to perform the operation of keeping a count of number of punishment signals generated by the computer implemented method, and then the method causes the processor to perform the operation of feeding back the reward signal and punishment signal to be inputted into the computer implemented method as a reward input and a punishment input, respectively.

In still another aspect, the method causes the processor to perform the operations of receiving a mismatch threshold from the instructor, comparing this mismatch threshold with the count of punishment signals, and generating a mismatch reset signal when the count of punishment signals exceeds the mismatch threshold. Then, the method causes the processor to perform the operation of sending the mismatch reset signal to the multimodal pre-processor, wherein mismatch reset signal forces the multimodal pre-processor to deselect the EXIN schema and to create a new EXIN schema. Next, the method causes the processor to perform the operation of sending the mismatch reset signal to the motor system to shut-off motor channels and stop the motor system from performing the particular action being performed.

Another aspect of the invention is a computer implemented method that causes a processor to perform the operation of combining the sensory inputs with the count of reward signals to create a reset toggle signal, when the count of reward signals is drastically reduced or the sensory inputs reflect significantly changed emotional states. Then, the method causes the processor to perform the operation of sending the reset toggle signal to the multimodal pre-processor, wherein reset toggle signal forces the multimodal pre-processor to stop creating the EXIN schema, and next the method further causes the processor to perform the operation of sending this reset toggle signal to the motor system to shut-off motor channels and stop the motor system from performing actions.

In an aspect of the present invention, a computer implemented method for dynamic task selection causes a processor to perform the operation of receiving a success threshold from the instructor and causes the processor to perform the operation of using the count of reward signals to compute the reward frequency associated with the executed motor schema. Next, the method causes the processor to perform the operations of comparing the success threshold with reward frequency of the executed motor schema and storing the executed motor schema as a habit or skill when the reward frequency meets the success threshold required by the instructor.

In a further aspect of the invention, the computer implemented method further causes the processor to perform the operation of using the reward input as an enticing reset signal when the punishment input has a high value, whereby the enticing reset signal forces the computer implemented method to deselect the EXIN schemas and continue creating new EXIN schemas despite the high value of the punishment input.

In another aspect of the invention, the method causes the processor to perform the operation of calculating a set of statistics reflecting primacy/recency, frequency of occurrence, and reward and punishment associated with the biomodal spatio-temporal schema, with the multimodal spatio-temporal schema, and with the motor schema. Then, the method causes the processor to perform the operation of analyzing the set of statistics to resolve conflicts generated by a suddenly changing desired task or suddenly changing sensory inputs. Next, the method causes the processor to perform the operation of creating a conflict resolution signal based on the set of statistics, wherein the conflict resolution signal selects, to be processed, schemas that are more frequently executed and that have high reward signals associated with the schemas, and also selects to be processed schemas that are more recently executed than older schemas.

In still another aspect, the computer implemented method causes the processor to perform the operation of creating the EXIN schema by further combining the spatio-temporal schema with the bimodal spatio-temporal schema, the reward input, the punishment input, the emotional state, and the motivational state. Next, the method causes the processor to perform the operation of creating the motor schema by further combining the spatial schema and the bimodal spatio-temporal schema with the multimodal spatio-temporal schema, the motor system structures, and the EXIN schema.

Furthermore, the method in this aspect causes the processor to perform the operation of selecting the sensory inputs from a group consisting of: visual inputs, auditory inputs, kinematic inputs, tactile inputs, olfactory inputs, somatosensory inputs, and motor inputs.

In yet another aspect of the present invention, the operations performed by the processor are defined by differential equations with timing constraints that are implemented on a serial computer or on a parallel Analog Pulse Processing computer.

In still another aspect, in the computer implemented method, the EXIN schema corresponds to compressed representations of an EXternal motivator and INternal states and the motor schema corresponds to a sequence of joint rotations, where space corresponds to the joint rotations and time corresponds to a course taken by the joint rotations along the particular action.

In a further aspect of the invention, in the computer implemented method, the EXIN schemas, the motor schemas, and the spatio-temporal schemas are encoded and recognized via a spatio-temporal algorithm selected from a group consisting of: hARTSTORE network, HTM, SOC, and DBN.

The features of the above aspects of the present invention may be combined in many ways to produce a great variety of specific embodiments and aspects of the invention, as will be appreciated by those skilled in the art. Furthermore, the operations in the method embodiment are analogous to the operations which comprise the apparatus or system embodiment, and to the operations present in the computer program product embodiments embodied in a computer readable medium.

BRIEF DESCRIPTION OF THE DRAWINGS

The objects, features and advantages of the present invention will become better understood from the following detailed descriptions of the preferred embodiment of the invention in conjunction with reference to the following appended claims, and accompanying drawings where:

FIG. 6 is an outline detailing the breakdown of a task description and its corresponding steps to be followed by an agent and an instructor in accordance with one aspect of the invention;

FIG. 7 is an outline illustrating what structures and functions will be activated during the initialization process of the integrated architecture in accordance with one aspect of the invention:

FIG. 8 is an outline illustrating what structures and functions will be activated during the search process of the integrated architecture in accordance with one aspect of the invention;

DETAILED DESCRIPTION

Figure 1:
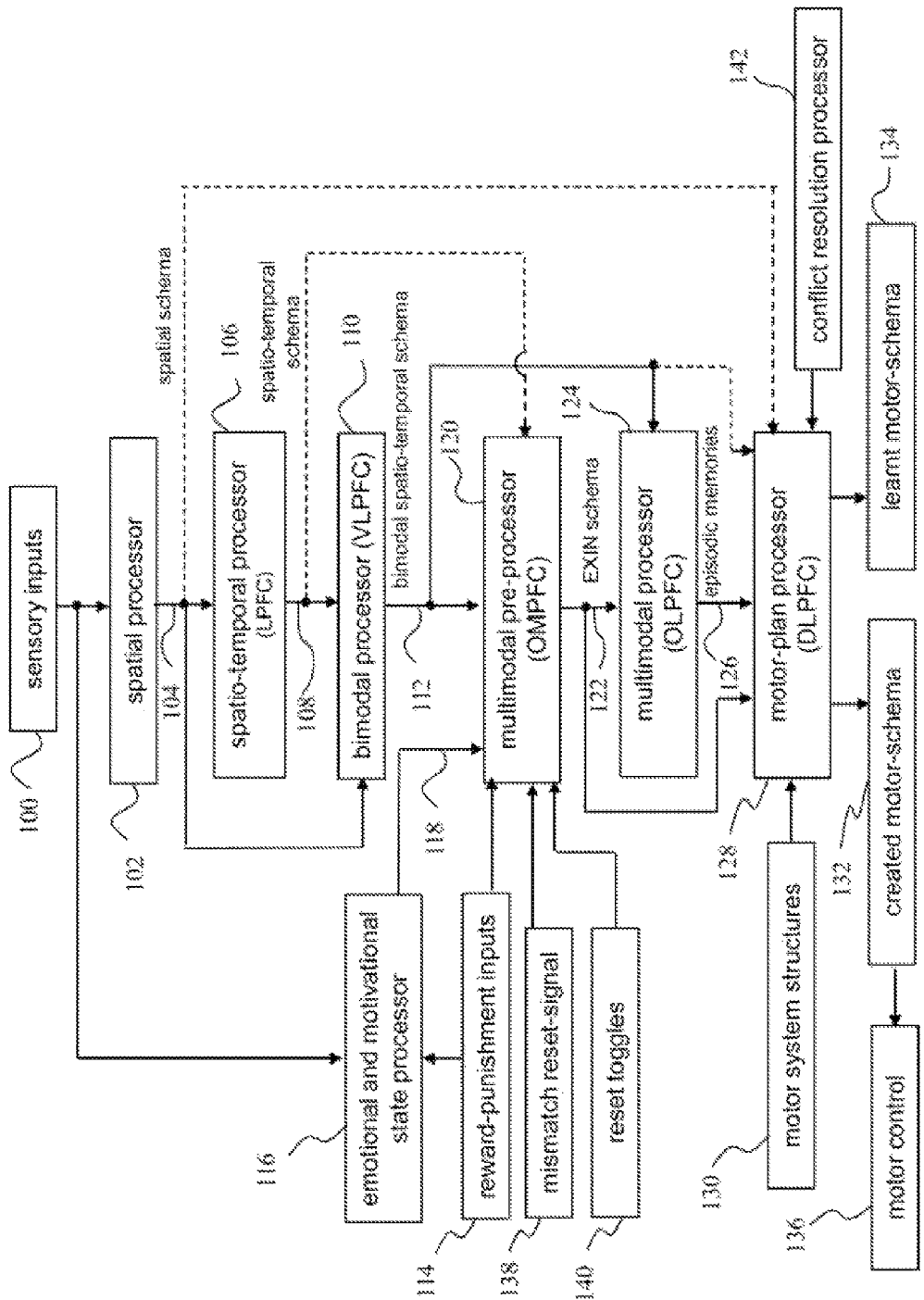
FIG. 1 is a block diagram of one aspect of the present invention.

The present invention relates to the fields of cognitive psychology, biology, neural science, signal processing, neural networks, executive control, and computer science. Specifically, the present invention relates to a system for dynamic task selection (executive control) inspired by cognitive psychology and biology, which allows the system to use and take advantage of complex inputs, of a large subset of PFC functions, of detailed anatomical constrains, and of detailed physiological constraints, thus creating a system that is time efficient and versatile in its implementation and in its integration into larger scale systems and level applications. More specifically, but without limitation thereto, the present invention pertains to a system, method and computer program product for mapping external inputs and internal goals toward actions that solve problems or elicit external rewards. The present invention allows an instructor to test and train an agent to perform dynamic task selection (executive control) by using a reward/punishment schema that computes the agent's emotional and motivational states from reward/punishment inputs and sensory inputs (such as visual, auditory, kinematic, tactile, olfactory, somatosensory, and motor inputs). Furthermore, the invention transforms the sensory inputs into unimodal and bimodal spatio-temporal schemas that are combined with the reward/punishment inputs and with the emotional and motivation states to create an external/internal schema (EXIN schema), that provides a compressed representation assessing the agent's emotions, motivations, and rewards. Next, the invention uses the EXIN schema to create a motor schema to be executed by the agent to dynamically perform the task selected by the instructor.

The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles, defined herein, may be applied to a wide range of embodiments. Thus, the present invention is not intended to be limited to the embodiments presented, but is to be accorded the widest scope consistent with the principles and novel features disclosed herein. Furthermore, it should be noted that unless explicitly stated otherwise, the figures included herein are illustrated diagrammatically and without any specific scale, as they are provided as qualitative illustrations of the concept of the present invention.

In order to provide a working frame of reference, first a glossary of some of the terms used in the description and claims is given as a central resource for the reader. The glossary is intended to provide the reader with a general understanding of various terms as they are used in this disclosure, and is not intended to limit the scope of these terms. Rather, the scope of the terms is intended to be construed with reference to this disclosure as a whole and with respect to the claims below. Next, a brief introduction is provided in the form of a narrative description of the present invention to give a conceptual understanding prior to developing the specific details. Finally, a detailed description of the elements is provided in order to enable the reader to make and use the various embodiments of the invention without involving extensive experimentation.

(1) GLOSSARY

Before describing the specific details of the present invention, it is useful to provide a centralized location for various terms used herein and in the claims. A definition has been included for these various terms. However, the definition provided should not be considered limiting to the extent that the terms are known in the art. These definitions are provided to assist in teaching a general understanding of the present invention.

AC or ATC—An acronym for "Auditory Cortex" or "Auditory Temporal Cortex." The term "AC" or "ATC," as used herein, is a standard term used in the fields of neural science, cognitive psychology, and biology to denote the Auditory Temporal Cortex region of a mammalian's brain.

AM—An acronym for "Amygdala." The term "AM," as used herein, is a standard term used in the fields of neural science, cognitive psychology, and biology to denote the Amygdala region of a mammalian's brain.

ART—An acronym for "Adaptive Resonance Theory." The term "ART network," as used herein, is a standard term used in the fields of neural networks and computer science to denote a neural network algorithm based in adaptive resonance theory. Non-limiting uses for the ART network comprise classification, unsupervised categorization, and clustering.

ARTSTORE—An acronym for "Adaptive Resonance Theory Store." The term "ARTSTORE," as used herein, is a standard term used in the fields of neural networks and computer science to denote a neural network, based in "adaptive resonance theory," that can "store" spatio-temporal patterns.

AS—An acronym for "Arousal System." The term "AS," as used herein, denotes a neural network that can detect mismatches between goal and present objects, partly served by the Hippocampus (HC).

ASC—An acronym for "Arousal System Counter." The term "ASC," as used herein, denotes a neural network that can count mismatches between goal and present objects, partly served by the Hippocampus (HC).

ATC—An acronym for "Auditory Temporal Cortex." The term "ATC," as used herein, is a standard term used in the fields of neural science, cognitive psychology, and biology to denote the Auditory Temporal Cortex region of a mammalian's brain.

BG—An acronym for "Basal Ganglia." The term "BG," as used herein, is a standard term used in the fields of neural science, cognitive psychology, and biology to denote the Basal Ganglia region of a mammalian's brain.

Computer readable media—The term "computer readable media," as used herein, denotes any media storage device that can interface with a computer and transfer data back and forth between the computer and the computer readable media. Some non-limiting examples of computer readable media include: an external computer connected to the system, an internet connection, a Compact Disk (CD), a Digital Versatile Disk/Digital Video Disk (DVD), a floppy disk, a magnetic tape, an internet web camera, a direct satellite link, a video cassette recorder (VCR), a removable hard drive, a digital camera, a video camera, a video cassette, an electronic email, a printer, a scanner, a fax, a solid-state recording media, a modem, a read only memory (ROM), and flash-type memories.

CQ—An acronym for "Competitive Queuing." The term "CQ" as used herein, denotes competitive queuing as related to executive control of motor plans.

CS—An acronym for "Conditioned Stimulus." The term "CS" as used herein, denotes the conditioned stimulus as related to the hippocampus region of a mammalian's brain.

DBN—An acronym for "Deep Belief Networks." The term "DBN," as used herein, is a standard term used in the fields of neural science and computer science to denote deep belief networks which can be used to recognize spatio-temporal patterns.

Dynamic Task Selection—The term "dynamic task selection," as used herein, is a standard term used, in the fields of neural science and computer science, to denote the ability to map external inputs and internal goals toward actions that solve problems or elicit rewards by dynamically selecting a task (problem solving action or reward eliciting action) to be performed. Henceforth, the terms "executive control," "dynamic task selection," "decision making," and "developing and refining of reward-eliciting behaviors," as used herein, will be generally used interchangeably as synonymous of each other.

DV—An acronym for "Difference Vector." The term "DV" as used herein, denotes the difference vector between target and present position for motor control.

EGC—An acronym for "EGocentric Coordinates." The term "EGC," as used herein, denotes the EGocentric Coordinates that provide to the LPFC the spatial information of observed objects/targets from an egocentric (as opposed to allocentric) coordinate frame the parietal cortex.

ESM—An acronym for "End Selector Mask." The term "ESM," as used herein, denotes an End Selector Mask that may be used as an ESM schemas used to bias inverse kinematics transforms. Therefore, the ESM schemas as used herein are masks of egocentric PPV (Present Position Vector) coordinates.

Executive Control—The term "executive control," as used herein, is a standard term used, in the fields of neural science and computer science, to denote the ability to map external inputs and internal goals toward actions that solve problems or elicit rewards. Henceforth, the terms "executive control," "dynamic task selection," "decision making," and "developing and refining of reward-eleciting behaviors," as used herein, will be generally used interchangeably as synonymous of each other.

EXIN—An acronym for "External/Internal schema."

FEF—An acronym for "Frontal Eye Fields." The term "FEF" as used herein, denotes the frontal eye fields as gated by the basal ganglia region of a mammalian's brain.

hARTSTORE—An acronym for "hierarchical Adaptive Resonance Theory Store." The term "hARTSTORE," as used herein, is defined as the straight forward n-tier, possibly multimodal, generalization of the original ARTSTORE neural network, wherein the original ARTSTORE is a standard term used in the fields of neural networks and computer science to denote a neural network, based in "adaptive resonance theory." that can "store" spatio-temporal patterns.

HC—An acronym for "Hippocampus." The term "HC," as used herein, is a standard term used in the fields of neural science, cognitive psychology, and biology to denote the Hippocampus region of a mammalian's brain. The hippocampus is known to play a role in orienting, conditioning, navigation, and the recall of memories.

HT—An acronym for "Hypothalamus." The term "HT," as used herein, is a standard term used in the fields of neural science, cognitive psychology, and biology to denote the Hypothalamus region of a mammalian's brain. The hypothalamus is known to play a role in the regulation of seasonal and circadian rhythms; the setting of homeostatic demands such as hunger, thirst, and sexual desire; and the distribution of reward signals.

HTMs—An acronym for "Hierarchical Temporal Memory." The term "HTM," as used herein, is a standard term used in the field of computational biology to denote a hierarchical temporal memory which can be used to recognize spatio-temporal patterns.

IED—An acronym for "Improvised Explosive Device." The term "IED," as used herein, is a standard term used in military to denote an Improvised Explosive Device, such as a road side bomb or a fragmentation bomb which is usually hidden or disguised as another object.

Input—The term "input," as used herein when used as a noun, is used to denote any device or body pan used to receive input from a user or an instructor or a system. Some non-limiting examples of inputs are: visual inputs, auditory inputs, kinematic inputs, tactile inputs, olfactory inputs, somatosensory inputs, and motor inputs. Some non-limiting examples of input devices are: eyes, ears, hands, skin, nose, a sensor set, a tracker, a keyboard, a microphone, a computer mouse, a video camera, a gesture recognizer, speech, a wireless signal communication, a game engine, and an electronic writing device, wherein the electronic writing device permits a user to write notes and to draw doodles on a pad to be transferred to a computer by use of a special electronic ball point pen.

Instruction means—The term "instruction means" when used as a noun with respect to this invention generally indicates a set of operations to be performed on a computer, and may represent pieces of a whole program or individual, separable, software (or hardware) modules. Non-limiting examples of "means" include computer program code (source or object code) and "hard-coded" electronics. The "means" may be stored in the memory of a computer or on a computer readable medium. In some cases, however, the term "means" refers to a class of device used to perform an operation, and thus the applicant intends to encompass within this language any structure presently existing or developed in the future that performs the same operation.

LH—An acronym for "Lateral Hypothalamus." The term "LH," as used herein, is a standard term used in the fields of neural science, cognitive psychology, and biology to denote the Lateral Hypothalamus region of a mammalian's brain.

LPFC—An acronym for "Lateral Pre-Frontal Cortex." The term "LPFC," as used herein, is a standard term used in the fields of neural science, cognitive psychology, and biology to denote the Lateral Pre-Frontal Cortex region of a mammalian's brain.

The term "M" as used herein, denotes the topmost motor schema of the three layer motor schema used by the invention to perform executive control of motor plans, where Q represents the layer below that, and P represents the layer below Q. Each Q layer is a STORE gradient of P's, while each P layer is an ART node cluster representing a delta PPV.

M1—An acronym for "Primary Motor Cortex." The term "M1" as used herein, denotes the primary motor cortex area gated by the basal ganglia region of a mammalian's brain.

An acronym for "Motor Cortex." The term "MC," as used herein, is a standard term used in the fields of neural science, cognitive psychology, and biology to denote the Motor Cortex region of a mammalian's brain.

MHT—An acronym for "Medial Hypothalamus." The term "MHT," as used herein, is a standard term used in the fields of neural science, cognitive psychology, and biology to denote the Medial Hypothalamus region of a mammalian's brain.

MT—An acronym for "Medial Temporal." The term "MT," as used herein, is a standard term used in the fields of neural science, cognitive psychology, and biology to denote the Medial Temporal region of a mammalian's brain.

OLPFC—An acronym for "Orbito-Lateral Pre-Frontal Cortex." The term "OLPFC," as used herein, is a standard term used in the fields of neural science, cognitive psychology, and biology to denote the Orbitolateral Pre-Frontal Cortex region of a mammalian's brain.

OMPFC—An acronym for "Orbito-Medial Pre-Frontal Cortex." The term "OMPFC," as used herein, is a standard term used in the fields of neural science, cognitive psychology, and biology to denote the Orbitomedial Pre-Frontal Cortex region of a mammalian's brain.

P—The term "P" as used herein, denotes the lowest layer motor schema of the three layer motor schema used by the invention to perform executive control of motor plans, where M represents the topmost motor schema and Q represents the layer below M and above P. Each Q layer is a STORE gradient of P's, while each P layer is an ART node cluster representing a delta PPV.

PC—An acronym for "Parietal Cortex." The term "PC," as used herein, is a standard term used in the fields of neural science, cognitive psychology, and biology to denote the Parietal Cortex region of a mammalian's brain.

PCC—An acronym for "Posterior Cingulate Cortex." The term "PCC," as used herein, is a standard term used in the fields of neural science, cognitive psychology, and biology to denote the Posterior Cingulate Cortex region of a mammalian's brain.

PFC—An acronym for "Prefrontal Cortex." The term "PFC," as used herein, is a standard term used in the fields of neural science, cognitive psychology, and biology to denote the Pre-Frontal Cortex region of a mammalian's brain.

PMC—An acronym for "Pre Motor Cortex/Area." The term "PMC" as used herein, denotes a pre motor area gated by the basal ganglia region of a mammalian's brain.

PPC—An acronym for "Posterior Parietal Cortex." The term "PPC," as used herein, is a standard term used in the fields of neural science, cognitive psychology, and biology to denote the Posterior Parietal Cortex region of a mammalian's brain.

PPTN—An acronym for "pedunculopontine tegmental nucleus." The term "PPTN," as used herein, is a standard term used in the fields of neural science, cognitive psychology, and biology to denote the pedunculopontine tegmental nucleus region of a mammalian's brain.

PPV—An acronym for "Present Position Vector." The term "PPV," as used herein, denotes the "present position vector" or perspective generated from the LPFC, Lateral Pre-Frontal Cortex, corresponding to the "proprioceptive/how."

Q—The term "Q" as used herein, denotes the middle motor schema of the three layer motor schema used by the invention to perform executive control of motor plans, where M represents the topmost layer of the motor schema positioned above the Q layer, and P represents the layer below Q. Each Q layer is a STORE gradient of P's, while each P layer is an ART node cluster representing a delta PPV.

Real-time—The term "real-time," as used herein, is a standard term used to relate to computer systems that update information, or perform a task, at the same rate as they receive data.

SEF—An acronym for "Supplementary Eye Fields." The term "SEF" as used herein, denotes the supplementary eye fields as gated by the basal ganglia region of a mammalian's brain.

SMA—An acronym for "Supplementary Motor Area." The term "SMA" as used herein, denotes a supplementary motor area gated by the basal ganglia region of a mammalian's brain.

SNc—An acronym for "Substantia Nigra Compacta." The term "SNc," as used herein, is a standard term used in the fields of neural science, cognitive psychology, and biology to denote the Substantia Nigra Compacta region of a mammalian's brain.

SOC—An acronym for "Sequence of Clusters." The term "SOC," as used herein, is a standard term used in the fields of neural science, artificial intelligence, and computer science, to denote a sequence of clusters.

TICA—An acronym for "Toddler-Inspired Cognitive Agent." The term "TICA" as used herein, denotes a system or method for a Toddler-Inspired Cognitive Agent.

THAL—An acronym for "Thalamus." The term "THAL," as used herein, is a standard term used in the fields of neural science, cognitive psychology, and biology to denote the Thalamus region of a mammalian's brain.

TPV—An acronym for "Target Position Vector." The term "TPV," as used herein, denotes the "target position vector" or perspective generated from the LPFC, Lateral Pre-Frontal Cortex, corresponding to the visual/where.

UCS—An acronym for "Un-Conditioned Stimulus." The term "UCS" as used herein, denotes the unconditioned stimulus as relayed by the hippocampus region of a mammalian's brain.

User—The term "user," as used herein, denotes a person or a participant utilizing the system or the method for navigating in a virtual environment that is suitable for allowing the user or participant to navigate in an immersive manner within the virtual environment while changing a view orientation in the virtual environment independently of the physical orientation of a user input, such as the orientation of the head of the user.

VAL THAL—An acronym for "Ventro-Anterior Thalamus." The term "VAL THAL," as used herein, is a standard term used in the fields of neural science, cognitive psychology, and biology to denote the Ventroanterior Thalamus region of a mammalian's brain.

VITE—An acronym for "Vector Integration to Endpoint." The term "VITE," as used herein, is a standard term used in the fields of neural networks and computer science to denote a neural network algorithm used to drive motor movements (e.g. by an arm).

VLPFC—An acronym for "Ventro-Lateral Pre-Frontal Cortex." The term "VLPFC," as used herein, is a standard term used in the fields of neural science, cognitive psychology, and biology to denote the Ventrolateral Pre-Frontal Cortex region of a mammalian's brain.

VTC—An acronym for "Visual Temporal Cortex." The term "VTC," as used herein, is a standard term used in the fields of neural science, cognitive psychology, and biology to denote the Visual Temporal Cortex region of a mammalian's brain.

WA—An acronym for "Wernicke's Area." The term "WA," as used herein, is a standard term used in the fields of neural science, cognitive psychology, and biology to denote the Wernicke's Area region of a mammalian's brain.

(2) OVERVIEW

In the following detailed description, numerous specific details are set forth in order to provide a more thorough understanding of the present invention. However, it will be apparent to one skilled in the an that the present invention may be practiced without necessarily being limited to these specific details. In other instances, well-known structures and devices are shown in block diagram form, rather than in detail, in order to avoid obscuring the present invention.

Some portions of the detailed description are presented in terms of a sequence of events and symbolic representations of operations on data bits within an electronic memory. These sequential descriptions and representations are the means used by artisans to most effectively convey the substance of their work to other artisans. The sequential steps and operations are generally those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals by terms such as bits, pixels, values, elements, files, and coefficients.

It is to be understood, that all these, and similar terms, are to be associated with the appropriate physical quantities and are merely convenient labels applied to these quantities. Unless specifically stated otherwise, as apparent from the following discussions, it is appreciated that throughout the present disclosure, discussions utilizing terms such as "acquiring," "amplifying," "analyzing," "augmenting," "calculating." "clustering," "combining." "communicating," "comparing," "computing," "controlling," "converting," "creating." "defining," "deselecting," "determining," "displaying" "downloading." "encoding," "executing," "extracting," "feeding back," "generating," "inputting," "interacting," "interfacing," "keeping," "learning," "locating,' "matching," "modeling," "obtaining," "outputting," "performing," "processing." "providing," "receiving," "recognizing," "recovering," "sending," "selecting,' "separating," "tracking." "transforming," "transmitting," "translating." "uploading." or "using," refer to the action and processes of a computer system, or similar electronic device that manipulates and transforms data represented as physical (electronic) quantities within the system's registers and memories into other data similarly represented as physical quantities within the computer system memories or registers or other such information storage, transmission, or display devices. Furthermore, the processes presented herein are not inherently related to any particular processor, processor component, computer, software, or other apparatus.

In addition, please note, the labels left, right, front, back, top, bottom, forward, reverse, north, west, south, east, north west, south west, north east, south east, clockwise and counter clockwise have been used for convenience purposes only and are not intended to imply any particular fixed direction. Instead, they are used to reflect relative locations and/or directions between various portions of an object of interest. As such, as the present invention is turned around and/or over, the above labels may change their relative configurations."

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112. Paragraph 6. In particular, the use of "step of" or "act of" in the claims herein is not intended to invoke the provisions of 35 U.S.C. 112. Paragraph 6.

The present invention, in an embodiment outlined below, sets forth a system which may be used for dynamic task selection (executive control) suitable for mapping external inputs and internal goals toward actions that solve problems or elicit external rewards. The disclosed system and method enables an instructor to test and train an agent to perform dynamic task selection (executive control) by using a reward/punishment schema that computes the agent's emotional and motivational states from reward/punishment inputs and sensory inputs (visual, auditory, kinematic, tactile, olfactory, somatosensory, and motor inputs).

A block diagram depicting the components of a computer system that may be used in conjunction with the present invention is provided in FIG. 1. The blocks in the diagram represent the functionality of the system (apparatus) of the present invention. The computer system comprises a spatial processor 102, a spatio-temporal processor 106, a bimodal processor 110, an emotional and motivational state processor 116, a multimodal pre-processor 120, a multimodal processor 124, and a motor-plan processor 128.

Initially, the spatial processor 102 receives sensory inputs 100 and transforms these sensory inputs into clusters of spatial patterns and then further transforms the clusters of spatial patterns into a spatial schema 104. Next, the spatio-temporal processor 106 (which, in this aspect of the invention, simulates the function of the Lateral Pre-Frontal Cortex, LPFC) encodes the transitions between the spatial schema and uses these transitions to cluster the spatial schema with the encoded spatial schema transitions generating a spatio-temporal schema 108. Then, the bimodal processor 110 (which, in this aspect, simulates the function of the VentroLateral Pre-Frontal Cortex. VLPFC) combines the spatial schema 104 with the spatio-temporal schema 108 to create a bimodal spatio-temporal schema 112.

Subsequently, the computer system receives reward and punishment inputs 114, wherein the reward input and the punishment input reflect a current state of an external environment. Then, the system uses an emotional and motivational state processor 116 to compute emotional and motivational states 118 from the sensory inputs 100 and the reward and punishment inputs 114. These emotional and motivational states 118 are then combined, by the multimodal pre-processor 120, with the bimodal spatio-temporal schema 112 and the reward-punishment inputs 114 to create an external/internal schema 122 (EXIN schema). The EXIN schema 122 provides a compressed representation assessing emotions, motivations, and rewards. In this aspect of the invention, the functionality of the multimodal pre-processor 120 mimics the functionality of the OrbitoMedial Pre-Frontal Cortex (OMPFC) region of a mammalian's brain.

Next, the multimodal processor 124 (which simulates, in this aspect of the invention, the function of the OrbitoLateral Pre-Frontal Cortex, OLPFC) combines the EXIN schema 122 with the bimodal spatio-temporal schema 112 to create a multimodal spatio-temporal schema 126. In this aspect of the invention, the multimodal spatio-temporal schema 126 serves as an episodic memory that can be replayed by the system.

Finally, the motor-plan processor 128 is used to either create or learn a motor-schema using the information stored in the episodic memories or multimodal spatio-temporal schemas 126. The motor-plan processor 128 receives structures 130 representing a plurality of elements of a motor system and combines the multimodal spatio-temporal schema 126 with the motor system structures 130 and with the EXIN schema 122 to create a motor schema 132.

One skilled in the art will appreciate that this aspect of the present invention may perform in two distinct modes, a training mode and a testing mode. Such that, when the system performs in the training mode, the created motor schema represents a learnt motor schema 134 associated with emotional and motivational-drive context derived from the EXIN schema 122 following a bottom-up input hierarchy. Where this learnt motor schema 134 is stored by the system for future recall. In addition, when the system performs in the testing mode, the created motor schema indicates how to perform a particular action. During the testing mode, the system's processor performs the operation of feeding back the EXIN schema 122 to be combined with the spatial schema 104 and the spatio-temporal schema 108 to create a top-down bimodal spatio-temporal schema, and then the processor further performs the operation of sending the created motor schema 132 to the motor system control 136 to perform a particular action.

In addition, the present aspect of the invention may generate a mismatch reset-signal 138 when the number of punishment inputs (signals) exceeds a mismatch threshold assigned a priori by the instructor. This mismatch reset signal 138 forces the multimodal pre-processor 120 to deselect the current EXIN schema 122 and to further perform the operation of creating a new EXIN schema. Furthermore, the mismatch reset signal 138 is sent to the motor system control 136 to shut-off the motor channels and stop the motor system from performing the particular action that is being performed and that is generating the excessive number of punishment inputs.

As one skilled in the an will appreciate, an aspect of the invention may equally create a reset toggle signal 140 when the count of reward signals is drastically reduced or the sensory inputs reflect significantly changed emotional states. This reset toggle signal 140 is sent to the multimodal pre-processor 120 to force the multimodal pre-processor to stop creating the current EXIN schema. Moreover, the reset toggle signal 140 is also sent to the motor system control 136 to shut-off motor channels and stop the motor system from performing actions.

Subsequently, the system may use a conflict resolution processor 142 to create a conflict resolution signal based on a set of statistics reflecting primacy/recency, frequency of occurrence, and reward and punishment associated with the biomodal spatio-temporal schema 112, with the multimodal spatio-temporal schema 126, and with the motor schema 132. As one skill in the art will appreciate, the conflict resolution processor 142 analyzes the set of statistics to resolve conflicts generated by a suddenly changing desired task or suddenly changing sensory inputs and then creates the conflict resolution signal based on the set of statistics. The conflict resolution signal selects schemas (to be processed) that are more frequently executed and that have high reward signals associated with the schemas, and also selects (to be processed) schemas that are more recently executed than older schemas.

The blocks in the flowchart of FIG. 1 may also be viewed as a series of functional modules and sub-modules, representing either software or hardware modules depending on the particular embodiment. These modules operate within the processor and memory of a general-purpose or special-purpose computer system and may be in the form of software instructions or "hard-coded" electronic circuits.

(3) PHYSICAL EMBODIMENTS OF THE PRESENT INVENTION

The present invention has three principal "physical" embodiments. The first is a system for mapping external inputs and internal goals toward actions that solve problems or elicit external rewards, wherein the system allows an instructor to test and train an agent to perform dynamic task selection (executive control) by using a reward/punishment schema that computes the agent's emotional and motivational states from reward/punishment inputs and sensory inputs, and wherein the system is typically but not limited to a computer system operating software in the form of a "hard coded" instruction set. In addition, the system maybe comprised of a processor, an input coupled with the processor for receiving a plurality of inputs to be processed into a motor-schema, and a memory coupled with the processor, wherein the memory includes instruction means that are executable by the processor for causing the processor to perform a plurality of operations.

Figure 2:
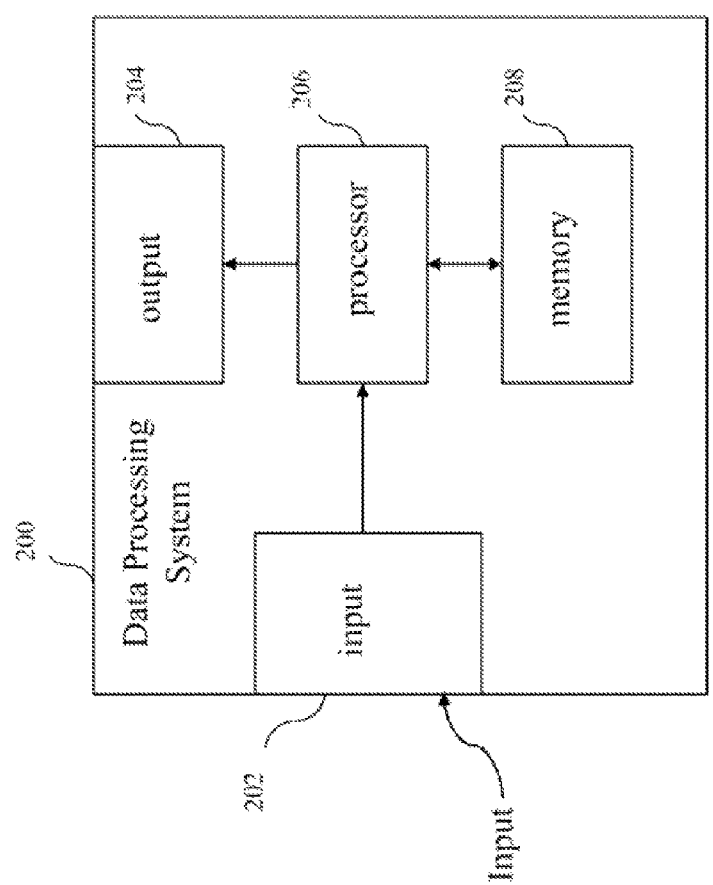
FIG. 2 is a block diagram of another aspect of the present invention.

A block diagram depicting the components of a computer system used in the present invention is provided in FIG. 2. The data processing system 200 comprises an input 202 for receiving sensory inputs (such as visual inputs, auditory inputs, kinematic inputs, tactile inputs, olfactory inputs, somatosensory inputs, and motor inputs) from an inputting means, video camera, audio phones, olfactory sensors, tactile sensors, or any computer readable medium such as a floppy disk, Compact Disk (CD), a Digital Versatile Disk/Digital Video Disk (DVD), and a removable hard drive. The input 202 may also be configured for receiving user input from another input device such as a microphone, keyboard, drawing pads, or a mouse, in order for an instructor to provide information to an agent and to the system, thus allowing the instructor to test and train an agent to perform dynamic task selection (executive control) by using a reward/punishment schema that computes the agent's emotional and motivational states from reward/punishment inputs and sensory inputs. Note that the input 102 may include multiple "ports" for receiving data and user input, and may also be configured to receive information from remote databases using wired or wireless connections. The output 204 is connected with the processor for providing output to the user (to the agent, to the instructor, to the system, or to the motor control), on a video display but also possibly through audio or kinesthetic signals (e.g., through pinching, vibrations, heat, etc.). Output may also be provided to other devices or other programs, e.g. to other software modules, for use therein, possibly serving as a wired or wireless gateway to external databases or other processing devices. The input 202 and the output 204 are both coupled with a processor 206, which may be a general-purpose computer processor or a specialized processor designed specifically for use with the present invention. The processor 206 is coupled with a memory 208 to permit storage of data and software to be manipulated by commands to the processor. Typical manifestations of the data processing system 200 may be incorporated into autonomous assembly robots, vehicles, cellular phones, portable digital assistants, and computers. It should be recognized by those skilled in the art that multiple processors may also be used and that the operations of the invention can be distributed across them.

This system may also be specially constructed, as an application-specific integrated circuit (ASIC), or as a readily reconfigurable device such as a field-programmable gate array (FPGA). The second physical embodiment is a computer implemented method, typically in the form of software, operated using a data processing system (computer). The method comprising an act of causing a data processing system to perform a plurality of operations.

Figure 3:
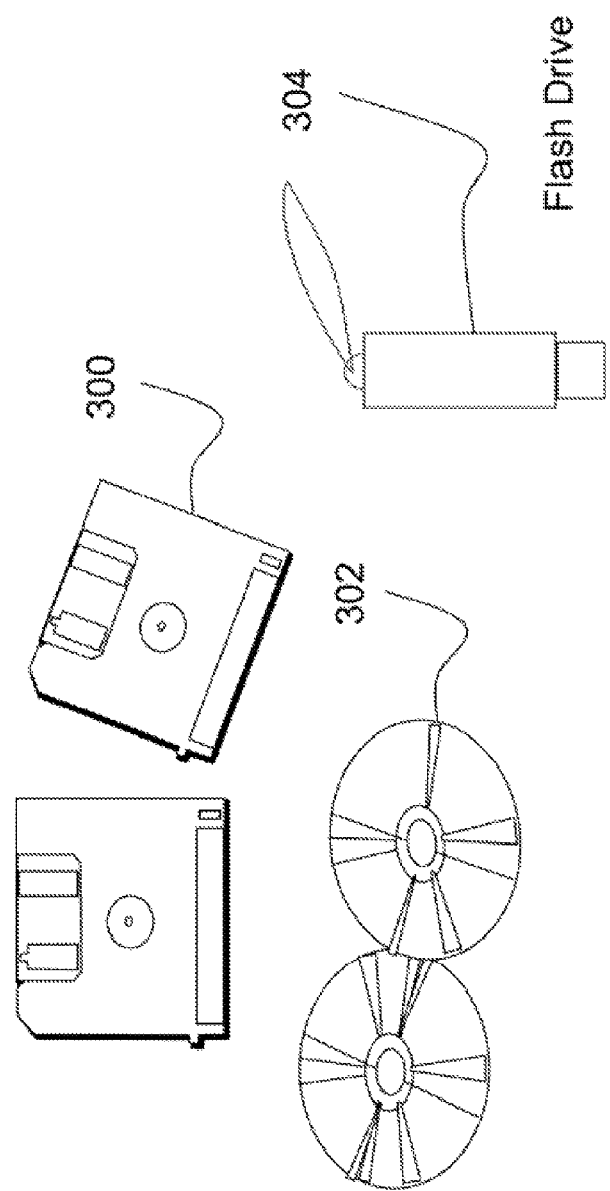
FIG. 3 is an illustrative diagram of a computer program product aspect of the present invention.

It should be noted that the operations performed by the present invention may be encoded as a computer program product or a computer program embodied in a computer-readable medium. Thus, the third principal physical embodiment of the present invention is a computer program product comprising computer-readable means stored on a non-transitory computer readable medium, that are executable by a computer having a processor for causing the processor to perform a plurality of the operations. The computer program generally represents computer-readable code stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read only memory (ROM), and flash-type memories. An illustrative diagram of a computer program embodied in a computer-readable medium and embodying the present invention is depicted in FIG. 3. The computer program product embodied in a computer readable medium is depicted as a floppy disk 300, an optical disk 302 such as a CD or DVD, or a flash drive 304. However, as mentioned previously, the computer program generally represents computer-readable code stored on any desirable computer readable medium.

The term "instruction means" as used with respect to this invention generally indicates a set of operations to be performed on a computer, and may represent pieces of a whole program or individual, separable, software modules. The instruction means are executable by a computer to cause the computer to perform the operations. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk 300, a CD-ROM 302, and a flash drive 304.

(4) DETAILED DESCRIPTION OF THE ELEMENTS

One skilled in the art will appreciate that the following description provides just one of many different ways that the above described system and method may be implemented in pseudo-code.

The general aspects of a system for dynamic task selection (executive control) were previously described above in relation to FIG. 1. Specifics regarding an embodiment will now be presented. In particular, detailed discussions are provided regarding the main components of an embodiment for dynamic task selection (executive control) and the correspondence of these main components with cognitive psychology and biology, which allows the present invention to use and take advantage of complex inputs, of a large subset of PFC functions, of detailed anatomical constrains, and of detailed physiological constraints. In turn, taking advantage of complex inputs, PFC functions, and anatomical and physiological constrains, allows the present invention to be time efficient and versatile in its implementation and integration into larger scale systems and level applications.

For further understand, a list of the major functional components of the present invention is presented below in Section A. Second, a description of how the major functional components can be implemented in a challenge problem using robotics is presented in Section B. Finally, detail anatomical and physiological data supporting the bio-plausibility of the model will be presented in Sections C and D, wherein the model presented is defined by differential equations with timing constraints and its implementation can be carried out on a serial digital (e.g. Von Neumann) or parallel analog (e.g. Analog Pulse Processing) computer.

A. Major Functional Components

At a high level, the major functional components in a model of the present invention are: 1) drives and EXIN schemas, 2) sensations and memories, and 3) habits. The drives and EXIN schemas incorporate internal emotions and motivations. The sensations and memories incorporate external stimuli and how to store and retrieve memories thereof. The habits incorporate two basic behaviors that drive actions and emotions.

Below is a list of the major functional components in the model and how they operate. While reading the sections below, references to anatomical correlates (e.g. AM, OMPFC, etc.) and connection between these structures (e.g. AC→WA/MT→LPFC, auditory→AM) will be explained in much greater detail in sections C to D. The embodiment of the integrated architecture is referred to as TICA, for Toddler-Inspired Cognitive Agent. TICA (agent) listens to an instructor and then tries to fulfill the instructor's commands.

A.1. Drives and EXIN Schemas

"Drives" are internal emotions or urges that are influenced by innate or learned external factors (e.g. looming figures cause fear). The "drives" compete against each other (e.g. fear v. explore) and produce only one winner and influence behavior selection.

"EXIN" schemas are a compressed representation of EXternal motivators (e.g. looming figure) and INternal states (e.g. fear and reward/punishment). The "EXIN" schemas help choose motor plans based on reward/punishment.

A.1.1. List of Drives

Each pair of opponent drives competes in a gated dipole, and the winning drive from each gated dipole competes with the winner from other gated dipoles. The gated dipoles are a neural network meant to simulate competition with habituation. That is, each winner will "tire," ceding its place to other competitors, who will also tire and be replaced. Below is a list of non-limiting dipoles used with an aspect of the present invention:

a. "Please Instructor" vs. "Ignore Instructor"
b. "Explore" vs. "Exploit"
c. "Fear" vs. "Relief"

An aspect of the present invention assumes (or program TICA to that effect) that only the "Please Instructor" drive has reverberation, or tonic support that prevents its gradual replacement. This is to maintain fixation on the instructor's commands. The "Please Instructor" drive can cede its place, however, if competing drives (especially "Ignore Instructor") have sufficient strength.

A.1.2. Tie Breaking in Drives

If all drives are equally active, the aspect assumes (or program TICA to that effect) that the "Explore" drive will win. All drives output and affect EXIN schemas (along with reward/punishment and external state information).

A.1.3. Conditioned Reinforcers

Another aspect of the invention assumes (or program TICA to that effect) that the verbal expressions of "Look here", "Now you build . . . ", etc. have become conditioned reinforcers to the "Please Instructor" drive from a prior experience. These can be learned by repeatedly setting a drive high after applying the conditioned reinforcer. In a more ecologically valid scenario, the "Fear" drive might be driven high after the sight of a knife, for example.

A.1.4. Resets of EXIN Schemas and Episodic Memories

Negative rewards due to too many mismatches in the arousal system of the hippocampus cause the currently active EXIN schema to be turned off. A detailed description of how these mismatches are noted and counted will be presented in sections C and D. This shuts offsupport to the currently most active motor schema (unless it is supported top-down from OLPFC's episodic memory) and allows another motor schema to be selected.

Negative rewards from the "Ignore instructor" cause all EXIN schemas to be reset. This in turn, causes a new episodic memory to be chosen.

A.2. Sensations and Memories

Sensations are external stimuli such as language, visual objects, observed behaviors (aka recognized actions), etc. These sensations are grouped and stored into spatio-temporal "chunks", schemas, or memories. Memories can also be internal information such as motor schemas (e.g. to get to B, start at A and go left at some waypoint) or episodic memories (e.g. a particular trip from A to B). Furthermore, memories can be multi-modal (e.g., a sight of an egg might be linked to the sound of the word egg).

A.2.1. Auditory Expression Recognition—Language Schemas

The verbal expressions of "Look here", "Now you build . . . ," etc., can be encoded and recognized via a spatio-TEMPORAL hARTSTORE network, or if desired, hARTSTORE modules can be replaced with HTMs (Hierarchical Temporal Memory). In this aspect of the invention, the space is a WA/MT word, the time is a sequence of words, and the hARTSTORE is a neural network that can store spatio-temporal patterns. The topmost nodes in the hARTSTORE network will be called language schemas.

Furthermore, construction grammar allows the mapping of different syntactic variations to the same semantic construction, as an example. "Look here" and "Fix your eyes over here" would map to the same concept.

A.2.2. Visual Object Recognition—Object Schemas

The visual appearance of an item can be encoded and recognized via a SPATIO-temporal hARTSTORE network (the space is an IT image, and the time is a sequence of micro-saccades over the item). The topmost nodes in the hARTSTORE network will be called object schemas. Later, in another aspect of the invention, object schemas can be applied to scene or event schemas.

A.2.3. External and Internal State Recognition—EXIN Schemas

The EXternal and INternal state of TICA can be encoded and recognized via an ART network in OMPFC. The external state comes from LPFC and VLPFC. Then, the internal state comes from the amygdala, carrying drive state, and the ventroanterior thalamus, carrying reward state.

A.2.4. Action Generation—Motor Schemas

A sequence of joint rotations can be encoded and recognized via a SPATIO-temporal hARTSTORE (the space is the joint rotations, and the time is the course of these rotations along the action). These motor schemas are learnt from observing and chunking a sequence of inverse kinematics transforms. Such as the "Target Position Vector" (TPV) is from LPFC, visual/where. As another example, the "Present Position Vecor" (PPV) is from LPFC, proprioceptive/how.

Furthermore, motor schemas are polyvalent. They need bottom-up support from OMPFC (an EXIN node) AND top-down from either LPFC, visual/where and LPFC, proprioceptive/how or OLPFC (an episodic memory). The playback of motor schemas will be described below.

A.2.5. Action Recognition/where—Path/Trajectory Schemas

The trajectory of the body or hand of the instructor body or hand (in egocentric spatial coordinates) can be encoded and recognized via the mirror neuron system and a SPATIO-temporal hARTSTORE (the space is the instructor's body or hand position-translated into egocentric spatial coordinates—in PC, and the time is the course of this position along the action). The topmost nodes in the hARTSTORE network will be called path/trajectory schemas. Path/trajectory schemas are used to seed inverse kinematics transforms. Thus, they are in egocentric TPV (Target Position Vectors) coordinates found in LPFC, visual/where.

Figure 4:
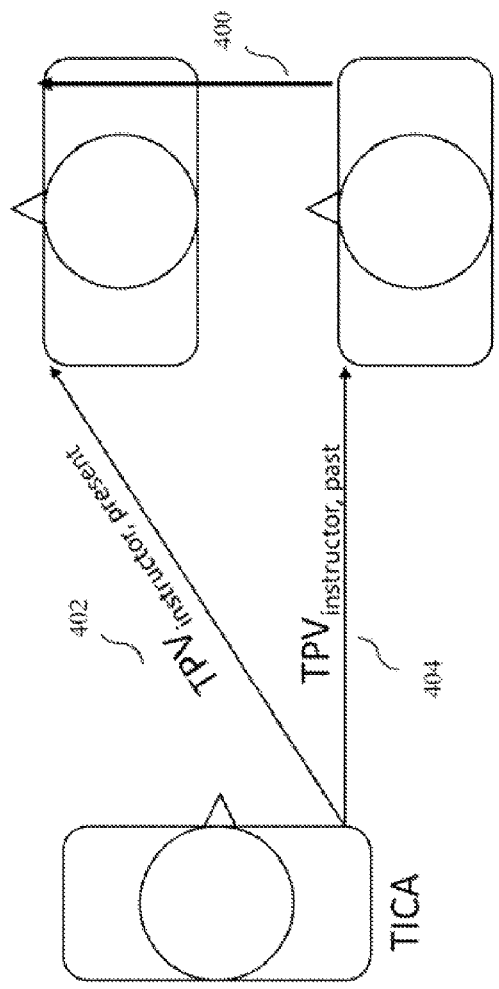
FIG. 4 depicts graphically the calculation of locomotion target position vectors (TPVs)

Since path/trajectory schemas are in egocentric TPV coordinates, it is up to the mirror system to derive one's TPV from observation of the instructor. In the locomotion case illustrated in FIG. 4, the mirror system would perform the calculation of TPV 400 (Target Position Vectors) from the TPV of the instructor present 402 and the TPV of the instructor past 404, as follows:

$$TPV = TPV_{instructor\_present} - TPV_{instructor\_past}$$

Figure 5:
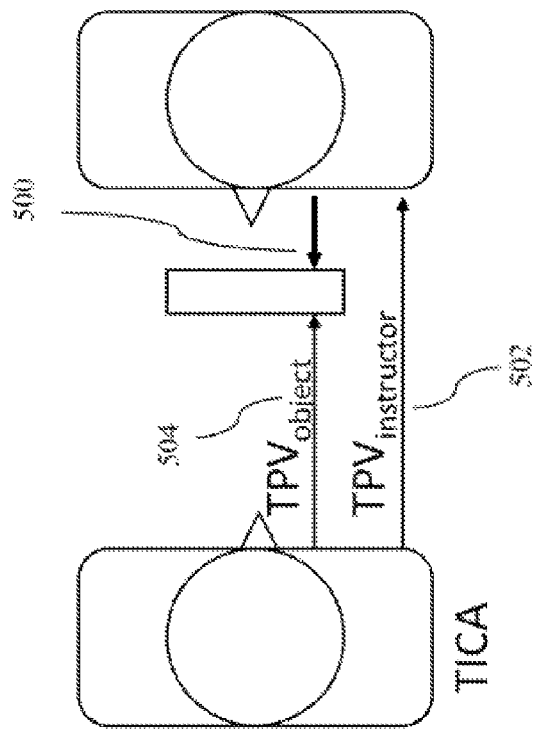
FIG. 5 depicts graphically the calculation of manipulation TPVs.

In the manipulation case illustrated in FIG. 5, the mirror system would perform the calculation of TPV 500 (Target Position Vectors) from the TPV of the instructor present 502 and the TPV of the object present 504, as follows:

$$TPV = TPV_{instructor\_present} - TPV_{object\_present}$$

Furthermore, STSa and Broca's area are known to be involved in the mirror system.

A.2.6. Action Recognition/How—ESM and Mirror Neuron-Based Motor Schemas

As one skilled in the art will appreciate, the joints used in the body or hand motions of the instructor (in egocentric joint angle masks) can be encoded and recognized via the mirror neuron system and a SPATIO-temporal hARTSTORE (the space is the instructor's body or hand joint position—translated into egocentric joint angle masks—in PC or MC, and the time is the course of this position along the action). The topmost nodes in the hARTSTORE network will be called end-selector mask (ESM) schemas. ESM schemas are used to bias inverse kinematics transforms. Therefore, the ESM schemas are masks of egocentric PPV (Present Position Vector) coordinates.

Since ESM schemas will be in egocentric PPV masks, an aspect of the invention calculates these masks by inverse kinematics from egocentric TPV coordinates, as described in the previous section. Using one's own experience, as one skilled in the art will appreciate, a TPV coordinate can create a PPV angle in the DLPFC. The chunking of these inverse kinematics calculations can form a motor schema learned from observation and the mirror system rather than doing the motions by oneself.

A.2.7. Bimodal Schemas

When "ESM schemas and Motor schemas" are bound in the VLPFC, this represents the typical forward kinematics case when no joints are locked or obstructions are encountered.

When "ESM schemas and Path/trajectory schemas" are bound in VLPFC, this represents the backup inverse kinematics case when some joints are locked or obstructions are encountered.

When "Motor schemas and object schemas" are bound in VLPFC, this represents what object was moved during an action in the typical forward kinematics case.

When "Path/trajectory schemas and object schemas" are bound in VLPFC, this represents what object was moved during an action in the backup inverse kinematics case.

When "Language schemas and object schemas" are bound in VLPFC, this represents a Sausserian link-a label and what that label looks like.

In other aspects of the invention, this can be extended later to a label and what an object affords, a label and what it smells like, etc.

A.2.8. Episodic Memories

Episodic memories can be created when OLPFC samples a sequence of bimodal schemas in VLPFC. Furthermore, OLPFC nodes also require bottom-up support from EXIN schemas of the OMPFC.

An aspect of the invention focuses on imitation learning and the ability to encode the actions of an instructor. These actions can be played back by reading out bimodal schemas into VLPFC. After separation of these bimodal schemas into unimodal schemas into LPFC, they can be played by DLPFC and its supporting structures. Just as before, OLPFC nodes require bottom-up support from OMPFC.

For the sake of concreteness, consider an ESM and motor schema. The former is loaded into LPFC, proprioceptive/how while the latter is loaded into DLPFC. The ESM biases the delta PPV layer in DLPFC, while the motor schema will download the actual delta PPV's. The delta PPV's specify a series of joint rotations (this actually occurs in a series of steps as explained in the motor schema section above.)

A.3. Habits

Habits are inbuilt motor plans that are triggered when there is a lack of external motivators or internal goals (e.g. no looming figures, no desire to find an object) or a match of external stimuli and internal goal (e.g. the sight of an object with an internal memory of it).

A.3.1. Tie Breaking in Behaviors

In the case that no motor schema is active, bottom-up habits are chosen in order of their energy expenditure. For example, given a set of salient points, first TICA will saccade to them, then it will turn its head, then it will locomote toward it.

A.3.2. Announcing Task Completion

When a match occurs, the match can be announces. For example, the match between a top-down goal and bottom-up input causes TICA to say "I found it" or "I built it." or otherwise announce the match to a user and/or other systems.

B. Challenge Problem: Egg Hunt

This section pertains to how the integrated architecture described in section A may be exercised in a challenge problem using robotics. The challenge problem described is that of an "Egg Hunt" described in section B. I. Here, the "Egg" represents a generic object of interest such as an IED or requested tool. Section 8.2 is a walkthrough (or flowchart) of how the major functional components give rise to executive control within the Egg Hunt problem. As previously stated, the embodiment of the integrated architecture is referred to as TICA, for Toddler-Inspired Cognitive Agent.

The sections below present an overview of an example challenge problem ("egg hunt"), while the detailed references to anatomical correlates (e.g. AM, OMPFC, etc.) and connection between these structures (e.g. AC→WA/MT→LPFC, auditory→AM) will be presented later in greater detail in sections C to D.

B.1. Task Description

The purpose of this task is to test integrated vision, language, navigation, and possibly manipulation. In the actual task, an agent will be placed in a room, shown an object, and asked to find a copy of the object in another room. Verbal hints and constraints may be given to the agent. A detailed breakdown of the task description 600 and several non-limiting examples of steps (to be followed by the agent and the instructor) are given in FIG. 6.

B.2. Task Walkthrough

An outline is presented in FIG. 7 and FIG. 8 illustrating what structures and functions will be activated in the integrated architecture for this aspect of the invention. In addition, references to information flow between major functional components (e.g. AC→WA/MT→LPFC, auditory) will form a flowchart of "what gets used when." As previously stated, the detailed structure of these components will be described in Sections C and D.

B.2.1. Initialization

FIG. 7 illustrates an outline of the initialization structures and functions used with the integrated architecture along with their corresponding information flow between major components. During the initialization aspect of the invention, TICA will wake up, see the instructor and an empty table, and idly scan the room, instructor, and table waiting for a command. Here, if there is lack of commands from the instructor, the "explore" drive will win when no other drive is active.

B.2.2. Search

FIG. 8 illustrates an outline of the search structures and functions used with the integrated architecture along with their corresponding information flow between major components. During the search aspect of the invention, TICA will search for items by looking around, turning its head, and locomoting until TICA finds a desired item.

C. Pre-Frontal Cortex (PFC)

The detailed anatomical and physiological data, supporting the present method and system for dynamic task selection, will be now presented. The method and the system for dynamic task selection disclosed by the present invention use a model that is defined by differential equations with timing constraints. The implementation of this model for dynamic task selection can be carried out on a serial digital (e.g. Von Neumann) or parallel analog (e.g. Analog Pulse Processing) computer.

C. I. Introduction: The Five Main Regions of the PFC and hARTSORE

Figure 9:
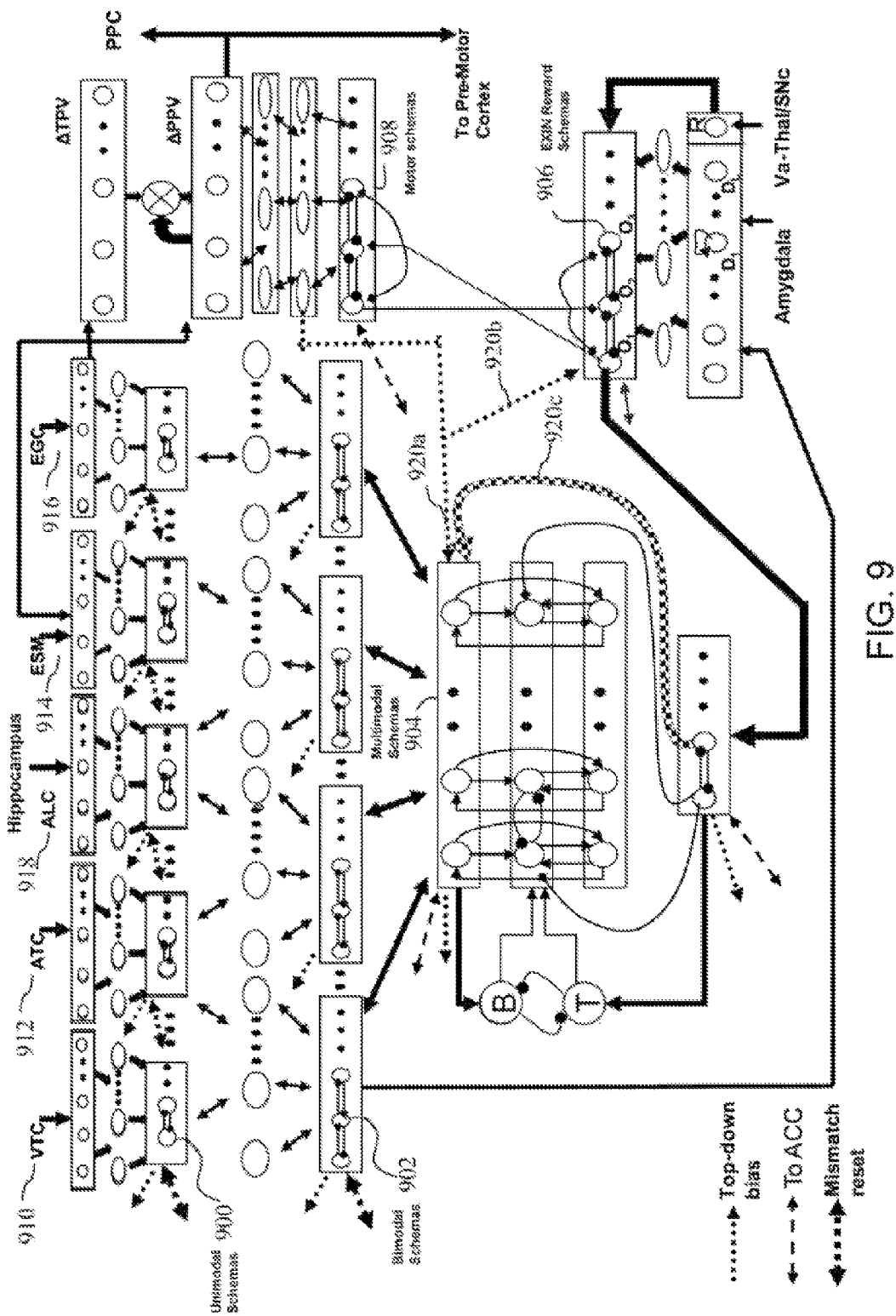
FIG. 9 is a flow diagram of how the five regions of the Pre-Frontal Cortex (PFC) interact with one another in one aspect of the present invention.

The PFC is a convergence zone that receives a variety of inputs including sensory systems, conical and sub-conical motor system structures, and limbic and midbrain structures. These inputs provide the PFC with a quick overall state of the environment and the internal states to enable the PFC in making executive plans and decisions on the tasks that are impending or have to be performed immediately. A schematic of the PFC architecture is shown in FIG. 9, which illustrates the five regions of the PFC.

The PFC is broken up into five main regions (proceeding counter-clockwise from the upper left corner of FIG. 9): the lateral PFC (LPFC) 900, the ventrolateral PFC (VLPFC) 902, the orbitolateral PFC (OLPFC) 904, the orbitomedial PFC (OMPFC) 906, and the dorsolateral PFC (DLPFC) 908. These regions are further discussed in "Pattern of Connections of the Prefrontal Cortex in the Rhesus Monkey Associated with Cortical Architecture. In: Frontal Lobe Function and Injury", Oxford University Press. Cambridge, 1991, by H. Barbas and D. Pandya, and in "Intrinsic Connections and Architectonics of the Superior Temporal Sulcus in the Rhesus Monkey", *Journal of Comparative Neurology*, vol. 290, 1989, pp. 451-471 by B. Seltzer and D. N. Pandya.

In this model according with one aspect of the invention, all five regions of the PFC are capable of chunking their respective inputs into a hierarchical set of chunks of spatio-temporal nature. This is realized in the models disclosed by the present invention by using a hierarchical ARTSTORE (hARTSTORE) network as described in "Fast Learning VIEWNET Architectures for Recognizing 3-D Objects from Multiple 2-D Views", *Neural Networks, vol.* 8, 1995, pp. 1053-1080 by G. Bradski and S. Grossberg. In this aspect of the invention, the hARTSTORE is defined as the straight forward n-tier, possibly multimodal, generalization of the original ARTSTORE network. An example of hARTSTORE is shown in FIG. 10.

Figure 10:
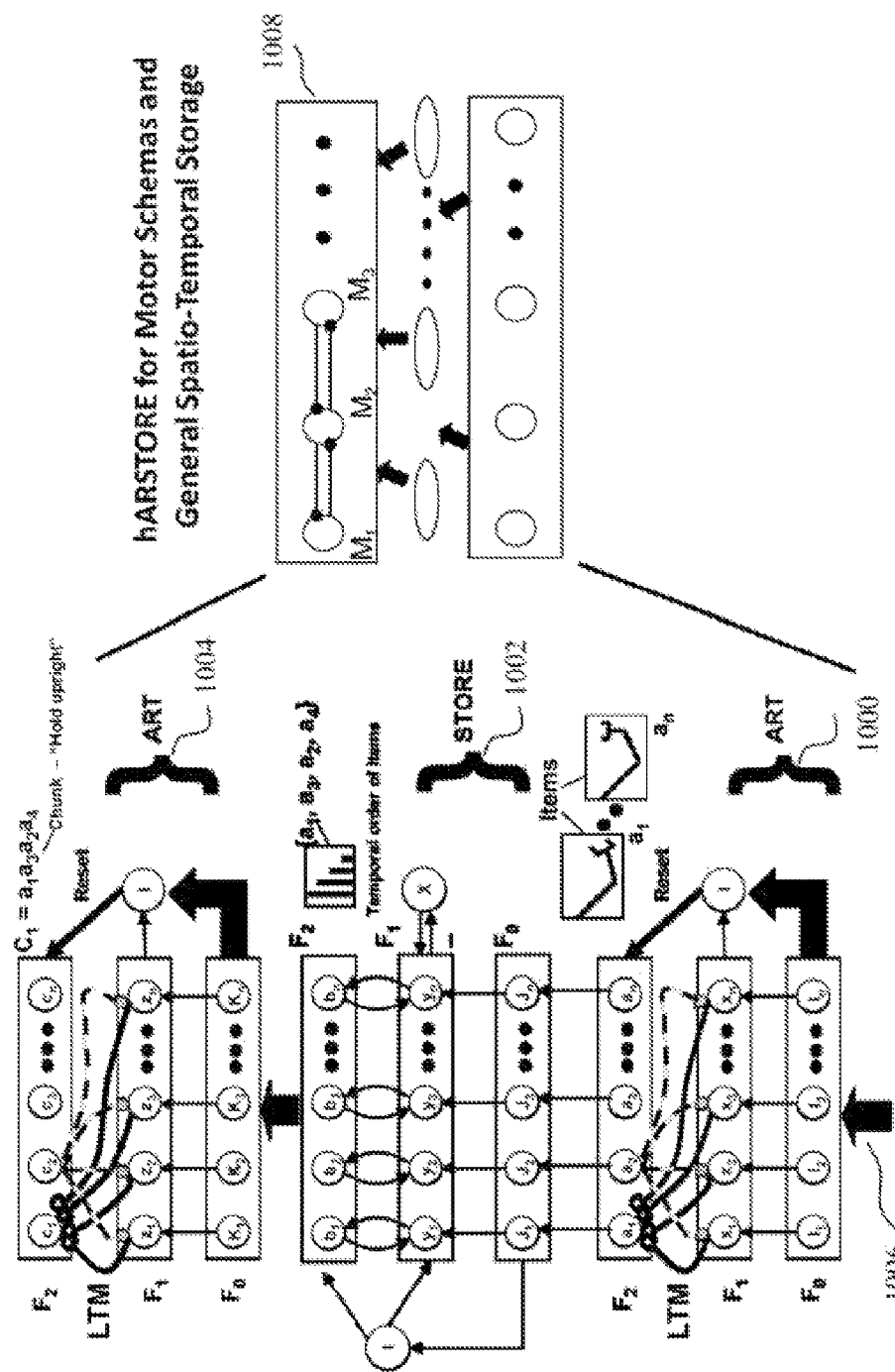
FIG. 10 depicts graphically the hARSTORE flow diagram for motor schemas and the general Spatio-Temporal storage in accordance with one aspect of the present invention.

FIG. 10 provides an example of the internal representation of neural activity within the PFC model disclosed by the present invention. The lowest ART layer 1000 clusters spatial patterns, the second STORE layer 1002 encodes transitions between these spatial patterns, leaving the third ART layer 1004 to cluster spatio-temporal chunks. Repeating this structure yields greater abstraction and generalization at higher layers. FIG. 10 illustrates how hARTSTORE can be used to encode sequences of robot poses 1006 as a motor schema by providing different inputs leads to schemas specialized to vision, language, paths, and so on. The bulk of the representations are in the form of spatio-temporal chunks 1008 (or working memories), their long-term storage and the associations between these stored memories.

C.2. Lateral Pre-Frontal Cortex (LPFC)

The LPFC is "unimodal" in nature and can receive spatio-temporal inputs from a variety of regions but is processed into chunks that are unimodal in nature (referring back to FIG. 9). These inputs include the visual (Inferotemporal; Visual Temporal Cortex, VTC, 910 in FIG. 9) and auditory (medial temporal; Auditory Temporal Cortex, ATC, 912 in FIG. 9) and also the somatosensory cortex (not explicitly shown in FIG. 9). For example, multiple views of an object can trigger a sequence of inputs in LPFC that in turn represent a set of view categories of an object as activated in the inferotemporal cortex. In an aspect of the invention, the current model introduces a separate LPFC region that is capable of storing spatio-temporal masks for motor sequences or End-effector Selector Masks (ESM) 914, that are either performed by oneself or others. These masks inform the PFC as to the exact nature of motor joints that realize any self-performed or observed action. Neurons that store information of observed action and not a self-performed action are "mirror neurons." There is ample evidence for the existence of these types of neurons in the PFC of monkeys as disclosed in "From Monkey-like Action Recognition to Human Language: An Evolutionary Framework for Neurolinguistics (with commentaries and author's response)", *Behavioral and Brain Sciences*, vol. 28, 2005, pp. 105-167 by M. A. Arbib, and in "Neural Expectations: A Possible Evolutionary Path from mManual Skills to Language", *Communication and Cognition*, vol. 29, 1997, pp. 393-424 M. A. Arbib and G. Rizzolatti.

The LPFC also receives spatial information of observed objects/targets from the parietal cortex (EGocentric Coordinates, EGC. 916 in FIG. 9). This information is stored in the LPFC chunking module as spatio-temporal chunks or "schemas" of body-centered coordinates as discussed in "A Self-Organizing Neural Model of Motor Equivalent Reaching and Tool Use by a Multijoint Arm", *Journal of Cognitive Neuroscience*, vol. 5, 1993, pp. 408-435 by D. Bullock, and S. Grossberg, and as also discussed in "Neural Representations for Sensory-Motor Control, III: Learning a Body-Centered Representation of 3-D Target Position". *Journal of Cognitive Neuroscience*, vol. 6, 1994, pp. 341-358 by F. H. Guenther, D. Bullock. D. Greve, and S. Grossberg, or in an ego-frame of reference.

Similarly, another LPFC module (ALlocentric Coordinates, ALC, 918 in FIG. 9) stores absolute or allocentric coordinates of targets/objects as computed in the hippocampus and transferred to the parietal cortex, PC, as discussed in "Precis of O'Keefe and Nadel's The Hippocampus as a Cognitive Map, and Author's Response to Commentaries", *Behavioral Brain Science*, vol. 2, 1979, pp. 487-534 by J. O'Keefe and L. Nadel, and in "A Simple Neural Network Model of the Hippocampus Suggesting its Path Finding Role in Episodic Memory Retrieval". *Learning and Memory*, vol. 12, 2005, pp. 193-208 by A. V. Samsonovich and G. A. Ascoli. Eventually the stored absolute or allocentric coordinates are transferred from the parietal cortex (PC) to the LPFC via strong associations of hippocampal sparse patterns of activity and distributed neocortical representations, as discussed by T. Teyler and P. Discenna in "The Role of Hippocampus in Memory. A Hypothesis", *Neuroscience & Biobehavioral Reviews*, vol. 9, 1985, pp. 377-389, and by L. Nadel and M. Moscovitch in "The Hippocampal Complex and Long-Term Memory Revisited", *Trends in Cognitive Sciences*, vol. 5, 2001, pp. 228-230.

Figure 11:
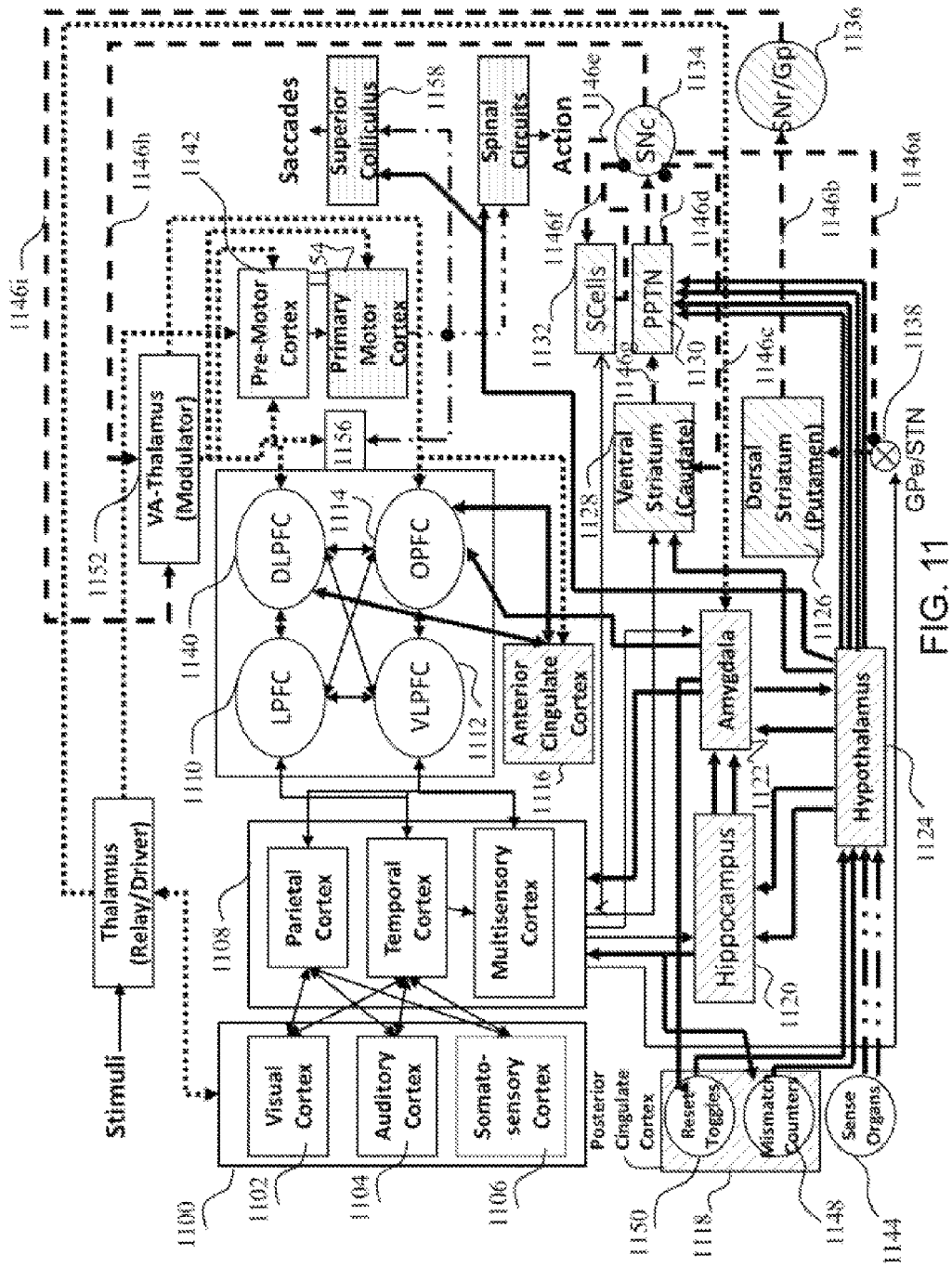
FIG. 11 is a flow diagram of an integrated architecture in another aspect of the present invention.

In this aspect of the invention, the LPFC projects feedback connections to the various conical regions from which it receives its inputs (as illustrated also in FIG. 11). This enables the PFC to control the focus of attention of other regions (top-down bias), thus ensuring that the inputs received to the PFC from these external brain regions are relevant and important to the task being performed, as discussed in "Context. Cortex and Dopamine: a Connectionist Approach to Behavior and Biology in Schizophrenia", *Psychological review*, vol. 99, 1992, pp. 45-77 by J. D. Cohen and D. Servan-Schreiber. The stored spatio-temporal chunks in LPFC serve as inputs into VLPFC that is primarily bimodal as discussed in "Further Observations on Conicofrontal Connections in the Rhesus Monkey", *Brain Research* vol. 117, 1976, pp. 369-386 by D. Chavis and D. N. Pandya, and as discussed in "An Anatomical Study of Converging Sensory Pathways within the Cerebral Cortex of the Monkey", *Brain*, vol. 93, 1970, pp. 793-820 by E. G. Jones and T. P. Powell.

C.3. Ventro-Lateral Pre-Frontal Cortex (VLPFC)

The Ventro-Lateral Pre-Frontal Cortex, VLPFC, can receive inputs from more than one source such as visual, auditory, or somatosensory cortex. In an aspect of the invention, it also can receive inputs from the region of the LPFC that stores spatial information or mirror neurons. The role of the VLPFC is thus to maintain contexts that are bimodal in nature. In the current model, the number of such spatio-temporal chunks/schemas and connections within the PFC is numerous. This is consistent with neurophysiological evidence that connections within the PFC are far more numerous than the connections coming in from other areas, as discussed in "Emotion, Memory, and the Brain", *Scientific America*, vol. 12, 2002, pp. 62-71 by J. E. LeDoux.

Furthermore, in the current model, the numerous layers within the LPFC and the VLPFC serve as working memories which enable input signals from outside the PFC to be kept active, and contribute to the sustained activity that has been observed during delay periods in the PFC, as discussed by A. Amsten in "Catecholamine Modulation of Prefrontal Conical Cognitive Function", *Trends in Cognitive Sciences*, vol. 2, 1998, pp. 436-447. In addition, the VLPFC also projects to the orbital portion of the PFC.

C.4. Orbito-Medial Pre-Frontal Cortex (OMPFC)

The orbital portion of PFC is subdivided into two portions in the current model. The OMPFC is the region that receives "multimodal" inputs from a variety of internal PFC regions including the VLPFC, LPFC and DLPFC. In addition, the OMPFC also receives inputs directly from the amygdala (and indirectly from the hippocampus and hypothalamus via amygdala) that provides an internal assessment of emotional and motivations states. It also receives input from the midbrain region substantia nigra compacta (SNc, via VA-Thalamus) about the rewarding/punishing nature of the current external environment. The OMPFC combines these inputs with multimodal sensory inputs to create external/internal (EXIN) schemas (spatio-temporal chunks) that provide the PFC with a compressed representation to assess emotions, motivations and rewards. There is neurophysiological evidence for these connections and this role for OMPFC, as described in "Amygdalo-Cortical Projections in the Monkey (Macaca fascicularis)", *Journal of Comparative Neurology*, vol. 230, 1984, pp. 465-496 by D. G. Amaral and J. L. Price, as described in "Direct and Indirect Pathways from the Amygdala to the Frontal-Lobe in Rhesus-Monkeys", *Journal of Comparative Neurology*, vol. 198, 1981, pp. 121-136 by L. J. Porrino, A. M. Crane, and P. S. Goldmanrakic, and as described in "Cortical Afferents to the Entorhinal Cortex of the Rhesus Monkey", *Science*, vol. 175, 1972, pp. 1471-1473 by G. W. Van Hoesen, D. N. Pandya, and N. Butters.

The OMPFC shares the information with other regions within the PFC, including the DLPFC, OLPFC, VLPFC and LPFC in the present model, consistent with neural data described in "Pattern of Connections of the Prefrontal Cortex in the Rhesus Monkey Associated with Cortical Architecture. In: Frontal Lobe Function and Injury", Oxford University Press, Cambridge, 1991 by H. Barbas and D. Pandya. In one aspect of the invention, the reward signals, $920a$, $920b$, and $920c$, are used primarily as triggers for reset within the OMPFC. If a given context is mildly punishing (punishment with low magnitude as generated by SNc), then the reward signal can generate a reset signal to shut off the most active of any OMPFC node. On the other hand, if punishment is severe, the reward signal $920c$ can completely reset all OMPFC nodes. This role of the reward signal in the OMPFC is a testable prediction and has an important role to play (as will be outlined in the context of the examples below).

C.5. Orbito-Lateral Pre-Frontal-Cortex (OLPFC)

The Orbito-Lateral Pre-Frontal-Cortex (OLPFC) is primarily multimodal and combines inputs from the VLPFC and the OMPFC. Unlike the OMPFC, the OLPFC is more involved in combining cognitive information coming from the cognitive working memories of LPFC and VLPFC to form super chunks of multimodal information, as described in "Laminar Conical Dynamics of Cognitive and Motor Working Memory, Sequence Learning and Performance: Toward a Unified Theory of How the Cerebral Cortex Works", *Psychological Review*, vol. 115, 2008, pp. 677-732 by S. Grossberg and L. Pearson. When this information is chunked up within the OLPFC, it serves as an "episodic memory" with very rich representation for events constructed from a variety of senses and contexts. This memory structure is different from other the PFC regions in that it is also capable of replay of events (via a competitive queuing mechanism—as described by B. J. Rhodes, D. Bullock, W. B. Vervey, B. B. Averbeck, and M. P. A. Page in "Learning and Production of Movement Sequences: Behavioral, Neurophysiological, and Modeling Perspectives". *Human Movement Science*, vol. 23, 2004, pp. 683-730) when needed. An example of such an event is when there is need to narrate a story from memory or copy a set of actions of an instructor during imitation. The formation of episodic memory and its recall compete within the OLPFC proceeds in two pans, during training and during testing. During training, bottom-up inputs from the VLPFC overwhelm the product of top-down inputs and their inchoate weights from the OMPFC and hence the OMPFC samples and learns the queue of bottom-up schemas. During testing, the balance is reversed and playback quenches bottom-up inputs. The OLPFC uses inputs from the OMPFC to establish the context of emotion and motivation. It has been observed that many regions of the PFC are indeed multimodal such as the "arcuate sulcus" region and "area 12" that receive inputs at least from three sensory modalities and numerous intrinsic connections from within the PFC, as described in "Architecture and Connections of the Frontal Lobe. In: The Frontal Lobes Revisited", IRBN Press, New York, 1987 by D. N. Pandya and C. L. Barnes. Recent studies of episodic memory using functional neuro-imaging techniques indicate that the PFC is activated while people remember events, as described in "The Role of Prefrontal Cortex During Tests of Episodic Memory", *Trend in Cognitive Sciences*, vol. 2, 1998, pp. 399-406 by S. Nolde. M. Johnson, and C. Raye. This review suggests that the PFC is also activated during remembering, depending on the reflective demands of the task. As more complex reflective processes are required (e.g. when criteria for evaluation have to be established and maintained, when the complexity of the evaluation required increases, and when retrieval of additional information is required beyond that activated by an initial cue) the PFC activity is more likely to occur. The model provided by the present invention indicates that this episodic memory is formed in the OLPFC.

C.6. Dorso-Lateral Pre-Frontal Cortex (DLPFC)

The Dorso-Lateral Pre-Frontal Cortex (DLPFC) has preferential connections with motor system structures as well as to the LPFC, VLPFC and OMPFC regions of the PFC in the model consistent with neurophysiological evidence, as described in "Prefrontal Connections of Medial Motor Areas in the Rhesus Monkey", *Journal of Comparative Neurology*, vol. 336, 1993, pp. 211-228 by J. Bates and P. Goldman-Rakic, and in "Autoradiographic Demonstration of a Projection from Prefrontal Association Cortex to the Superior Colliculus in the Rhesus Monkey", *Brain Research*, vol. 116, 1976, pp. 145-49 by P. S. Goldman and W. J. Nauta.

In a model according to one aspect of the invention, the DLPFC serves two very important functions. The first function is to serve as the site to transform cognitive information from the perceived world into motor plans. This role enables the DLPFC to "speak the language" of the motor cortices (especially pre-motor areas including the frontal eye fields, FEF). This transformation can be learned in a fashion during action perception cycles (as shown in "A Self-Organizing Neural Model of Motor Equivalent Reaching and Tool Use by a Multijoint Arm", *Journal of Cognitive Neuroscience*, vol. 5, 1993, pp. 408-435 by D. Bullock, and S. Grossberg) in a fashion invariant to limb geometry, redundancies in degrees of freedom and disturbances. The ESM schemas described earlier provide the motor context (or mirrors the motor context as the case maybe) as to what joints could be used to perform a particular action. The transformation enables the PFC to generate novel motor plans that enable correct actions in different contexts. The second role of the DLPFC is to also learn spatio-temporal chunks of these motor plans (or "motor schemas") as the system is performing various actions. These learned motor schemas are associated with the emotional and motivational drive context inputs from the OMPFC, thereby learning which motor schemas are rewarding to perform under different contexts.

A huge body of work implicates the DLPFC, in various working memory functions for a variety of complex behaviors, such as the findings discussed in "Prefrontal Neurons in Networks of Executive Memory", *Brain Research Bulletin*, vol. 52, 2000, pp. 331-336 by J. Fuster; discussed in "The Prefrontal Cortex: Complex Neural Properties for Complex Behavior", *Neuron*, vol. 22, 1999, pp. 15-17 by E. K. Miller; discussed in "Neural Mechanisms of Visual Working Memory in Prefrontal Cortex of the Macaque", *Journal of Neurosceince*, vol. 16, 1996, pp. 5154-5167 by E. K. Miller, C. A. Erickson, and R. Desimone: discussed in "Impairments on Nonspatial Self-Ordered and Externally Ordered Working Memory Tasks After Lesions of the Mid-Dorsal Pan of the Lateral Frontal Cortex in the Monkey", *Journal of Neuroscience*, vol. 15, 1995, pp. 359-375 by M. Petrides: discussed in "Mnemonic and Predictive Functions of Cortical Neurons in a Memory Task", *NeuroReport*, vol. 3, 1992, pp. 721-724 by J. Quintana and J. Fuster; discussed in "Functional Brain Imaging Studies of Cortical Mechanisms for Memory", *Science*, vol. 270, 1995, pp. 769-775 by L. G. Ungerleider; discussed in "A Neural System for Human Visual Working Memory", Proc. of the National Academy of Sciences, vol. 95, 1998, pp. 883-890 by L. Ungerleider. S. Courtney, and J. Haxby; and discussed in "Working Memory Contributions to Human Learning and Remembering", *Neuron*, vol. 22, 1999, pp. 19-22 by A. D. Wagner, and including serial order memory described in "Functional Specialization Within the Dorsolateral Frontal Cortex for Serial Order Memory", *Biological Sciences*, vol. 246, 1991, pp. 299-306 by M. Petrides.

An important role for the DLPFC in learning and/or controlling sequential movement has also been demonstrated in "Prefrontal Cortex and Spatial Sequencing in Macaque Monkey, *Experimental Brain Research*, vol. 78, 1989, pp. 447-64 by P. Barone and J. P. Joseph; in "Prefrontal Lesions Impair the Implicit and Explicit Learning of Sequences on Visuomotor Tasks", *Experimental Brain Research*, vol. 142, 2002, pp. 529-538 by B. Gomez, J. Gafman, I. Ruiz de Velasco, A. Pascual-Leone, and J. Garcia-Monco; in "Motor Sequence Learning: A Study with Positron Emission Tomography". Journal of Neuroscience, vol. 14. 1994, pp. 3775-3790 by I. H. Jenkins, D. J. Brooks. P. D. Nixon. R. S. J. Frackowiak, amd R. E. Passingham; in "The Anatomy of Motor Learning. I. The Frontal Cortex and Attention to Action", Journal of Neurophysiology, vol. 77, 1997, pp. 1313-1324 by M. Jueptner, K. M. Stephan, C. D. Frith, D. J. Brooks, R. S. J. Frackowiak, and R. E. Passingham; in "The Anatomy of Motor Learning. II. Subcortical Structures and Learning by Trial and Error", Journal of Neurophysiology, vol. 77, 1997, pp. 1325-1337 by M. Jueptner. C. D. Frith. D. J. Brooks, R. S. J. Frackowiak, and R. E. Passingham: in "Procedural Learning and the Prefrontal Cortex. In Structure and Function of the Human Prefrontal Cortex", New York: Annals of the New York Academy of Sciences, vol. 769, 1995, pp. 61-70 by A. Pascual-Leone. J. Grafman, and M. Hallett; and in "The Role of the Dorsolateral Prefrontal Cortex in Implicit Procedural Learning", *Experimental Brain Research*, vol. 107, 1996, pp. 479-85 by A. Pascual-Leone, E. M. Wassermann, J. Grafman, and M. Hallett.

Furthermore, activation in the DLPFC tends to be more extensive during learning of a new sequence than during execution of a learned sequence, as described in "Transition of Brain Activation from Frontal to Parietal Areas in Visuomotor Sequence Learning"*Journal of Neuroscience*, vol. 18, 1998, pp. 1827-1840 by K. Sakai, H. Okihide, S. Miyauchi, R. Takino, Y. Sasaki, and B. Pütz. Most frequently rewarded and executed plans in any given context is downloaded into posterior parietal cortex (PPC) (as described in "Neural Dynamics of Learning and Performance of Fixed Sequences: Latency Pattern Reorganizations and the N-STREAMS Model", Boston University Technical Report CAS/CNS-02-005. Boston, Mass., United States, 2002 by B. Rhodes and D. Bullock) wherein they are chunked into its "procedural memory" as habits or skills. The PPC subsequently influences the efficiency of the executed actions via the cerebellar side-loop in order to make frequently performed actions (e.g., riding a bicycle) very efficient and fast. This process enables older well-established behaviors to be "reclaimed" as the PFC independent pathways, as described in "An Integrative Theory of Prefrontal Cortex Function", *Annual Review of Neuroscience*, vol. 24, 2001, pp. 167-202 by E. K. Miller and J. D. Cohen. This also enables the PFC to focus its resources only on those situations that require deliberate planning and decision making.

D. An Integrated Architecture

D.1. Review of PFC Structure and Function

An integrated architecture of the PFC is shown in FIG. 11 along with all its accessory brain regions that assist the PFC in making executive decisions and plans and enable the system to exhibit adaptive behaviors in the face of changing environments.

The cognitive inputs of PFC are provided primarily from the sensory cortex 1100 (consisting of the visual cortex 1102, auditory cortex 1104, and somatosensory cortex 1106) and the processed input is fed into the next level 1108 (the parietal cortex, temporal cortex, and multisensory cortex) where the information is stored in long-term memory. This layer of the cerebral cortex interfaces with LPFC 1110 and VLPFC 1112 primarily to provide cognitive inputs which are then chunked to create higher level spatio-temporal schemas inside the PFC, that provides the PFC with all the necessary inputs about the sensed world. These inputs are then further chunked into multimodal chunks in OPFC 1114 (specifically OLPFC) to create an episodic memory of the events sensed from the external world. The OPFC 1114 (specifically OMPFC) is connected to the limbic structure (consisting of the anterior cingulated cortex 1116, posterior cingulated cortex 1118, hippocampus 1120, amygdala 1122, and hypothalamus 1124) and forebrain structure (consisting of the dorsal stratum 1126, ventral striatum 1128, PPTN 1130, SCells 1132, SNc "Substantia Nigra Compacta" 1134, SNr/Gp 1136, and GPe/STN 1138) which provide the PFC with inputs about emotional, motivational, and rewarding situations (more details are provided below in Section D.2).

The LPFC 1110 and OLPFC interface with DLPFC 1140 to either create novel motor plans or learn and refine old motor plans. These motor plans along with other cognitive plans (such as body centered path plans) are constantly monitored by the anterior cingulate cortex 1116 for conflicts (more details are provided below in Section D.3). If there is a conflict, the anterior cingulate cortex uses prior knowledge of rewards and contexts to resolve them. Motor schemas learned at DLPFC 1140 are also reinforced by drives via OMPFC. This allows for selection of some motor plans that may be rewarding or motivational salient. The DLPFC 1140 interacts with motor control by downloading its deliberately created plans into a pre-motor area 1142. This system of interactions is described below in Section D.8.

D.2. Limbic Cortices and PFC

One fundamental feature of the PFC is to enable behavior selection. This is achieved in one aspect of the invention via a set of three important neural signals (illustrated in the lower left corner of FIG. 11) that the PFC utilizes to enable switching of states.

D2.1.

The first kind of signal is directly from the sense organs 1144, such as tongue sensations (e.g. juice rewards) that serves as inputs to the hypothalamus 1124, and then is translated as a dopaminergic burst signal that finds its way to the OMPFC (lines 1146a, 1146b, 1146c, 1146d, 1146e, 1146f, 1146g, 1146h, and 1146i in FIG. 11). The OMPFC has reinforcing pathways to motor schemas in DLPFC that can affect selection of motor plans and hence behaviors.

This behavior is modeled in one aspect of the present invention where the processor receives the sensory inputs and transforms the sensory inputs into spatial schemas, spatio-temporal schemas, and bimodal spatio-temporal schema. In this aspect of the invention, the processor receives a reward input and a punishment input, wherein the reward input and the punishment input reflect a current state of an external environment, and computes an emotional state and a motivational state from the sensory inputs, the reward input, and the punishment input. Next, the processor combines the bimodal spatio-temporal schema with the reward input, the punishment input, the emotional state, and the motivational state to create an external/internal schema (EXIN schema), wherein the EXIN schema provides a compressed representation assessing emotions, motivations, and rewards. Then, the processor combines the EXIN schema with the bimodal spatio-temporal schema to create a multimodal spatio-temporal schema that serves as an episodic memory that can be replayed by the system. Subsequently, the processor receives structures representing a plurality of elements of a motor system, and combines the multimodal spatio-temporal schema with the motor system structures and the EXIN schema to create a motor schema.

D.2.2.

A second type of signal, the "mismatch counters" 1148, is received from the hippocampus that keeps track of the number of mismatches in the perceptual domain given that an entity is looking for something specific (i.e., with a goal in mind). When the counter exceeds a threshold, the system sends a negative reward to the hypothalamus 1124 which then depresses dopaminergic bursts that result in a reset of an OMPFC node, thereby causing a new motor schema to be selected. It also may result in shutting off the "GO" signal in motor channels, thereby stopping currently active behaviors.

This behavior is modeled in one the aspect of the present invention where the processor receives a mismatch threshold from the instructor, compares the mismatch threshold with the count of punishment signals, and generates a mismatch reset signal when the count of punishment signals exceeds the mismatch threshold. Next, in this aspect of the invention, the processor sends the mismatch reset signal to the multimodal pre-processor, wherein mismatch reset signal forces the multimodal pre-processor to deselect the EXIN schema and to further perform the operation of creating a new EXIN schema. Then, the processor sends the mismatch reset signal to the motor system to shut-off motor channels and stop the motor system from performing the particular action being performed.

D.2.3.

The third type of signal corresponds to a different type of neuron that is connected to the drive nodes of the amygdala 1122, the "reset toggles" 1150 in FIG. 11. These neurons serve to toggle the state of amygdala neurons if there is antagonistic rebound in the drive nodes after a certain goal or emotionally relevant inputs are removed (e.g., fear is released—produces a relief rebound). This toggle of states is monitored by the PFC and results in a negative reward to the OMPFC that can cause total reset of all previously operational motor schemas and hence can result in the termination of behaviors prior to the release of input stimulus (e.g. fear stimulus).

This behavior is modeled in one the aspect of the present invention where the processor combines the sensory inputs with the count of reward signals to create a "reset toggle signal" when the count of reward signals is drastically reduced or the sensory inputs reflect significantly changed emotional states. In this aspect of the invention, the processor sends the reset toggle signal to the multimodal pre-processor, wherein reset toggle signal forces the multimodal pre-processor to stop creating the EXIN schema. Next, the processor sends the reset toggle signal to the motor system to shut-off motor channels and stop the motor system from performing actions.

Furthermore, the present invention submits that the last two types of signals—resetting of motor schemas due to perceptual or drive states—are computed somewhere between the PFC (comprising the LPFC 1110, VLPFC 11112, OPFC 1114, and DLPFC 1140 in FIG. 11) and the limbic cortex (comprising the anterior cingulated cortex 1116, posterior cingulated cortex 118, hippocampus 1120, amygdala 1122, and hypothalamus 1124 in FIG. 11). In particular, there is neurophysiological evidence that implicates the posterior cingulate cortex 1118 to maintain computations as performed by mismatch and toggle switches. The posterior cingulate cortex contains neurons that monitor eye movements and respond to sensory stimuli. Ablation studies suggest that this region is involved in spatial orientation and memory, as described in "Functional Heterogeneity in Cingulate Cortex The Anterior Executive and Posterior Evaluative Regions". *Cerebral Cortex*, vol. 2, 1992, pp. 435-443 by B. Vogt. D. M. Finch, and C. R. Olson. Connections between posterior cingulate and parahippocampal cortices contribute to these processes.

In operation, hippocampal/perceptual mismatch resets are relayed via the parahippocampal region to the posterior cingulate cortex that maintains the mismatch counts. In an aspect of the present invention, the PFC is a center implicated for deliberative actions wherein diverse information is received and processed before a final decision to act is made. These actions are far more accurate in its response to the world but require some time to form and be executed. On the other hand, in "Emotion, Memory, and the Brain", *Scientific America*, vol. 12, 2002, pp. 62-71, J. E. LeDoux has stated that there is evidence for a crude pathway that responds in a very rapid fashion to impending danger This pathway (solid dark black arrow lines in FIG. 11) begins when the sensed stimuli (such as motion or a loud noise) is fed via the thalamus to the amygdala 1122 and this signal is then sent as an input to the hypothalamus 1124 that generates an emotional response to the sensed stimuli by activating other regions such as the spinal circuits. This response can be wide ranging from reflexive action (e.g., to remove hand from sensed heat) to an increase in blood pressure, sweating or heat rate due to a fear stimulus, etc.

D.3. Anterior Cingulate Cortex (ACC)

There are several situations in which the PFC can face conflicts. This can happen either during the execution or selection of a plan. For example, a given context could invoke a certain plan to be instated for execution when a different context may rapidly emerge that may result in a conflict. These kinds of conflicts are resolved in one aspect of the invention by the anterior cingulate cortex (ACC 1116). The ACC processes and resolves conflicts from several regions in the PFC including the OLPFC, VLPFC and DLPFC. In order to resolve conflicts, the ACC maintains a constant set of statistics about the spatiotemporal chunks being clustered in various regions of OLPFC, VLPFC and DLPFC. These statistics include the primacy/recency (via a STORE type network), the frequency (via a counter similar to the posterior cingulate cortex, PCC), and also an associated utility (reward/punishment) provided by SNc (basal ganglia). By combining these inputs, the ACC resolves conflicts by selecting plans/chunks that are either more frequently been executed in the past with reward, or may select more recent plans vs. older plans if the older plans have not been active in the recent past and so on. In this way, the ACC biases competitions within the PFC towards task demands rather than using simple saliency or match metrics. The plans selected by the ACC after conflict resolution is relayed back to the appropriate the PFC region in order to enable the PFC to make executive decisions and generate contextually appropriate behaviors.

This aspect of the invention is implemented by the processor calculating a set of statistics reflecting primacy/recency, frequency of occurrence, and reward and punishment associated with the biomodal spatio-temporal schema, with the multimodal spatio-temporal schema, and with the motor schema. In this aspect of the invention, the processor analyzes the set of statistics to resolve conflicts generated by a suddenly changing desired task or suddenly changing sensory inputs. Furthermore, the processor creates a conflict resolution signal based on the set of statistics, wherein the conflict resolution signal selects, to be processed, schemas that are more frequently executed and that have high reward signals associated with the schemas, and also selects to be processed schemas that are more recently executed than older schemas.

It has been extensively proposed that the ACC is often associated with conflict resolution, such in the descriptions in "Anterior Cingulate and the Monitoring of Response Conflict Evidence from an fMRI Study of Overt Verb Generation". *Journal of Cognitive Neuroscience*, vol. 12, 2000, pp. 298-309 by D. Barch, T. Braver, F. Sabb, C. Douglas, and D. Noll; in the descriptions in "Conflict Monitoring Versus Selection-for-Action in Anterior Cingulate Cortex". *Nature*, vol. 402, 1999, pp. 179-81 by M. Botvinick, L. E. Nystrom, K. Fissell, C. S. Carter, and J. D. Cohen; in the descriptions in "Anterior Cingulate Cortex, Error Detection, and the Online Monitoring of Performance", *Science*, vol. 280, 1998, pp. 747-749 by C. S. Carter, T. S. Braver, D. M. Barch, M. M. Botvinick. D. Noll, and J. D. Cohen; in the descriptions in the descriptions in "Anterior Cingulate and Prefrontal Cortex Who's in Control?", *Nature Neuroscience, vol.* 3, 2000, pp. 421-423 by J. D. Cohen, M. Botvinick, and C. S. Carter, and in the descriptions in "Dissociating the Role of Dorsolateral Prefrontal Cortex and Anterior Cingulate Cortex in Cognitive Control", *Science*, vol. 288, 2000, pp. 1835-1837 by A. W. MacDonald, J. D. Cohen, V. A. Stenger, and C. S. Carter.

The model used in the present invention is consistent with the experiments performed in "Conflict Monitoring and Cognitive Control", Psychological Review, vol. 108, 2001, pp. 624-652 M. Botvinick, T. Braver, D. Barch, C. Carter, and J. Cohen, where it was proposed that an ACC-based monitoring system regulates the PFC for processing conflicts and provides a feedback loop to the PFC. Both the ACC and the lateral parts of the PFC are widely believed to play an important part in attentional control as well, as discussed in "Storage and Executive Processes in the Frontal Lobes", *Science*, vol. 283, 1999, pp. 1657-61 by E. E. Smith and J. Jonides. It has also been argued that the ACC is involved in resolving conflicts at the response level (DLPFC). The present invention uses the ACC to interact with lateral pans of the PFC, including target detection regions of the PFC such as OLPFC, VLPFC as well as response level regions such as the DLPFC to assist the PFC in resolving conflicts.

This function is supported by the descriptions in "The Way Irrelevant Dimensions Are Processed Depends on What They Overlap With: The Case of Stroop- and Simonlike Stimuli", *Psychological Research/Psychologische Forschung*, vol. 56, 1994, pp. 130-135 by S. Kornblum: in the descriptions in "Dimensional Overlap: Cognitive Basis for Stimulus-Response Compatibility: A Model and Taxonomy", *Psychological Review*, vol. 97, 1990, pp. 253-270 by S. Kornblum. T. Hasbroucq, and A. Osman; and in the descriptions in "A Parallel Distributed Processing Model of Stimulus-Stimulus and Stimulus—Response Compatibility", *Cognitive Psychology*, vol. 38, 1999, pp. 386-432 by H. Zhang, J. Zhang, and S. Kornblum. Therefore, the model of the present invention is also consistent with the fundamental dichotomy observed in anterior and posterior cingulate cortices, wherein the posterior cingulate cortex subserves evaluative functions such as monitoring sensory events and its own behavior, while the anterior cingulate cortex subserves primarily executive functions predominant in the PFC, as discussed in "Functional Heterogeneity in Cingulate Cortex: The Anterior Executive and Posterior Evaluative Regions", *Cerebral Cortex*, vol. 2, 1992, pp. 435-443 by B. Vogt, D. M. Finch, and C. R. Olson.

D.4. Basal Ganglia

The SNr and GPi 1136 of the basal ganglia exert tonic inhibition on ventroanterior thalamus (VA-THAL) 1152. This in turn prevents the initiation of motor actions in the supplementary motor area (SMA), the pre motor area (PMC) 1142, the primary motor cortex (M1) 1154, the frontal eye fields/supplementary eye fields (FEF/SEF) 1156, and in the deep layers of the superior colliculus 1158. However, the ventroanterior thalamus can be disinhibited when the SNr and GPi are inhibited from SNc and/or the dorsal striatum 1126. This pathway is known as the direct pathway. The ventroanterior thalamus can also be indirectly inhibited via the SNc and/or the dorsal striatum, and the GPe and the STN 1138. This causes the braking or stopping of movement. In one aspect of the invention, the motor schemas in the DLPFC are started or stopped via support (or lack thereof) of the OMPFC's EXIN schemas. The EXIN schemas can in turn be reset based on the amount of reward they receive from the SNc.

Therefore, the SNc is excited by actual rewards (UCS's) from the ventral striatum, ventral palladium, and the PPTN, as described in "The Patterns of Afferent Innervation of the Core and Shell in the Accumbens Part of the Rat Ventral Striatum Immunohistochemical Detection of Retrogradely Transported Fluoro-Gold", *Journal of Comparative Neurology*, vol. 338, 1993, pp. 255-78 by J. Brog, A. Salyapongse, A. Deutch, and D. Zahm, and the SNc is inhibited by an adaptively timed prediction of rewards (CS's) via the striosomal cells, as described in "The Neostriatal Mosaic: Multiple Levels of Compartmental Organization in the Basal Ganglia", *Annual Review Neuroscience*, vol. 15, 1992, pp. 285-320 by C. Gerfen. If the prediction of the reward is not matched with an actual reward, the SNc blocks the currently active motor activity as unrewarding via the indirect pathway. Otherwise, fulfilled reward expectations or unexpected rewards allow the currently active motor action via the direct pathway. Again, in this aspect of the invention, the SNc first interfaces with OMPFC's EXIN schemas before any motor schema can be started or stopped. This use of parallel reward channels is based on the model described in "How the Basal Ganglia Use Parallel Excitatory and Inhibitory Learning Pathways to Selectively Respond to Unexpected Rewarding Cues", *Journal of Neuroscience*, vol. 19, 1999, pp. 10502-10511 by J. Brown, D. Bullock, and S. Grossberg. Their spectral timing mechanism is mediated by metabotropic glutamate receptor (mGluR) dynamics, which better explains what biological mechanisms compute reward than the well-known class of Temporal Difference (TD) models described in "A Framework for Mesencephalic Dopamine Systems Based on Predictive Hebbian Learning", *Journal of Neuroscience*, vol. 16, 1996, pp. 1936-1947 by P. Montague, P. Dayan, and T. Sejnowski; described in "A Neural Substrate of Prediction and Reward". *Science*, vol. 275, 1997, pp. 1593-1598 by W. Schultz, P. Dayan, and P. Montague: and described in "Learning of Sequential Movements by Neural Network Model with Dopamine-Like Reinforcement Signal", *Experimental Brain Research*, vol. 121, 1998, pp. 350-354 by R. Suri and W. Schultz.

D.5 Amygdala

The emotional centers of the brain, such as the amygdala, interact with sensory and prefrontal cortices to generate affective states, attend to motivationally salient sensory events, and elicit motivated behaviors. Activating the feedback loop between cognitive and emotional centers is predicted to generate a cognitive-emotional resonance that can support conscious awareness of events happening in the world and how we feel about them. Recent experimental data provide increasing support for the role of interactions between amygdala and orbitofrontal cortex in the control of response selection and predicted outcomes based on value acquired through previously rewarded behaviors, as described in "Control of Response Selection by Reinforcer Interaction of Amygdala and Orbital Prefrontal Cortex", *Journal of Neuroscience*, vol. 20, 2000, pp. 4311-4319 by M. G. Baxter, A. Parker, C. C. C. Lindner, A. D. Izquiredo, and E. A. Murray, and as described in "Encoding Predicted Outcome and Acquired Value in Orbitofrontal Cortex During Cue Sampling Depends Upon Input from Basolateral Amygdala", *Neuron*, vol. 39, 2003, pp. 855-867 by G. Schoenbaum, B. Setlow, M. P. Saddoris, and M. Gallagher.

An aspect of the invention has modeled emotions within this model using a gated dipole circuit which represents a minimal network that is capable of generating a sustained but habituating (decaying) "ON" response to onset to a cue, as well as a transient "OFF" response (or antagonistic rebound) to offset of a cue. This gated dipole along with associated learning and feedback has been used to demonstrate various classical conditioning paradigms, as those described in "Neural Dynamics of Attentionally-Modulated Pavlovian Conditioning: Conditioned Reinforcement, Inhibition and Opponent Processing", *Psychobiology*, vol. 15, 1987, pp. 195-240 by S. Grossberg and N. A. Schmajuk. The amygdala is modeled as a bank of dipole circuits with opposing emotional drives as the outputs of each bank. These drives compete for every CS (conditioned stimulus) input and the winner drive is used to gate the selection of a motivationally relevant plan at PFC.

Figure 12:
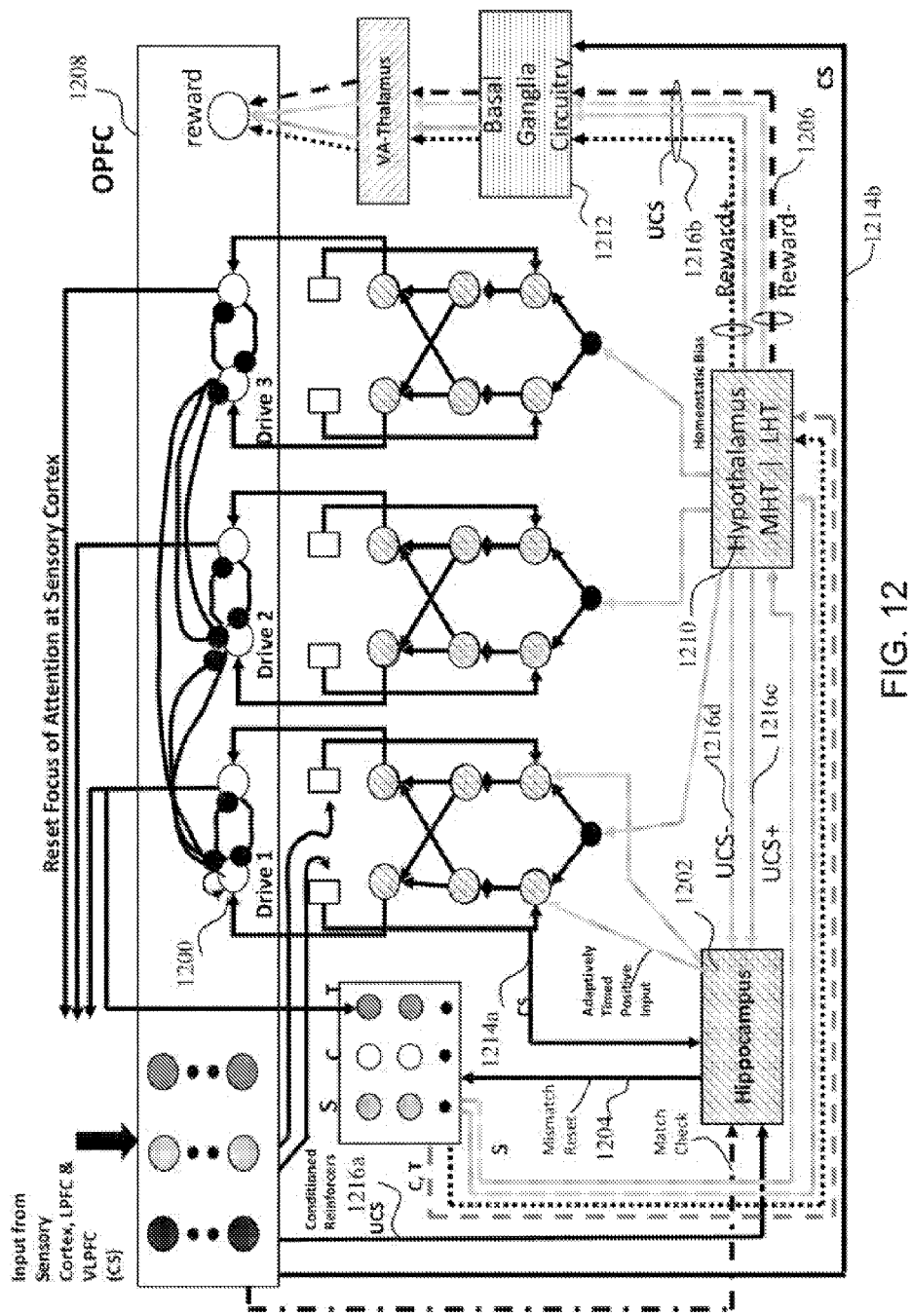
FIG. 12 is a flow diagram of a graphical depiction of the Limbic Cortices within an integrated architecture in still another aspect of the present invention.

Three types of learning take place among these representations: Conditioned reinforcer learning (CRL) enables sensory events to activate emotional reactions at drive representations (e.g. a bell may be conditioned to produce a fear reaction). Incentive motivational learning (IML) enables emotions to generate a motivational set that biases the system to process cognitive information consistent with that emotion. Motor learning allows sensory and cognitive representations to generate actions. The ability of a conditioned reinforcer to set a drive 1200 in an adaptively timed manor is addressed by the hippocampus 1202. Furthermore, the hypothalamus imposes homeostatic demands on the amygdala's drive. Lastly, incentive motivational learning (IML) is augmented in this aspect of the invention by fixing the "Ignore" drive to a "Reset Toggle" 1204 also in the amygdala. The "Reset Toggle" 1204 causes a behavior reset by sending negative reward 1206 to OPFC 1208 via the medial hypothalamus (MHT) 1210 and the basal ganglia (BG) 1212 (as illustrated in FIG. 12).

D.6. Hippocampus

The hippocampus 1202 is known to play a role in orienting, conditioning, navigation, and the recall of memories. In an aspect of the present invention, the first three disparate functions are actually served by a common neural substrate and its underlying mechanisms, namely the dentate gyrus-CA3 interface and spectral basis functions mediated by mGluR dynamics as described in "SET-APART: Spectral Separation ART with Hippocampal Dynamics for Novelty Detection", *Proc. of the International Conference on Cognitive and Neural Systems*, 2007, pp. 102 by N. Srinivasa and S. E. Chelian. Therefore, a single computational paradigm underlies (featural) space, time, and space-time comparisons. In the first case, featural dissimilarity is measured on the spectrum, integrated, and compared against a dimensionless parameter known as vigilance. In the second case, the temporal difference between conditioned stimulus (CS) 1214*a* and 1214*b* and unconditioned stimulus (UCS) 1216*a* and 1216*b* onset is measured on the spectrum. In the third case, the spatial difference between target and actual position is measured on at least one spectrum.

D.6.1. Orienting System

In the first case, featural dissimilarity is measured on the spectrum, integrated, and compared against a dimensionless parameter known as vigilance. If the mismatch is too great, an arousal wave is sent to the neocortex triggering orienting behaviors, attention shifts, and emotional frustration. Vigilance may be increased by punishing or unexpected consequences as described in "Neural Dynamics of Category Learning and Recognition: Attention, Memory Consolidation, and Amnesia. In Brain Structure, Learning, and Memory", Westview Press, Boulder, 1987 by G. A. Carpenter and S. Grossberg, and in "Attentive Supervised Learning and Recognition by an Adaptive Resonance System. In: Neural Networks for Vision and Image Processing", MIT Press, Cambridge, 1992 by G. A. Carpenter, S. Grossberg, N. Markuzon, J. H. Reynolds, and D. B. Rosen. Indeed, in one aspect of the invention, repeated dissonance within a given modality (e.g. vision) causes a behavior reset by sending negative reward 1206 to OPFC 1208 via MHT 1210 and BG 1212 (as illustrated in FIG. 12). The count of the number of dissonant events can be implemented by a PST network as discussed in "A Neural Model of How the Brain Represents and Compares Multi-Digit Numbers: Spatial and Categorical Processes", *Neural Networks*, vol. 16, 2003, pp. 1107-1140 by S. Grossberg and D. Repin.

These types of reactions are modeled by sensory-cognitive circuits that are called Adaptive Resonance Theory, or ART models. The ART models have been used to explain and predict a large body of cognitive and neural data about recognition learning, attention, and memory search, as described in "Attentive Supervised Learning and Recognition by an Adaptive Resonance System. In: Neural Networks for Vision and Image Processing", MIT Press, Cambridge, 1992 by G. A. Carpenter, S. Grossberg, N. Markuzon, J. H. Reynolds, and D. B. Rosen. In ART, an attentional subsystem and an orienting subsystem, or novelty detector, enable the network to stabilize its learning without external teaching signals. The attentional subsystem undergoes both bottom-up and top-down learning. Top-down weights represent expectations of bottom-up inputs. A match between bottom-up and top-down patterns allows learning, while mismatch triggers memory search.

D.6.2. Adaptive Timing

Although the amygdala has been identified as a primary site in the expression of emotion and stimulus-reward association by the findings in "The Contribution of the Amygdala to Normal and Abnormal Emotional States", *Trends of Neurosciences*, vol. 16, 1993, pp. 328-333 by J. P. Aggleton, the hippocampal formation has been implicated in the adaptively timed processing of cognitive-emotional interactions. The START model described in "A Neural Network Model of Adaptively Timed Reinforcement Learning and Hippocampal Dynamics", *Cognitive Brain Research*, vol. 1, 1992, pp. 3-38 by S. Grossberg and J. W. L. Merrill, and in "The Hippocampus and Cerebellum in Adaptively Timed Learning, Recognition, and Movement", *Journal of Cognitive Neuroscience*, vol. 8, 1996, pp. 257-277 by S. Grossberg and J. W. L. Merrill, accomplished this by showing how circuits within the hippocampus (that are capable of adaptively timed learning) can modulate the response of ART and READ circuits that have already been summarized.

The START model described in "The Hippocampus and Cerebellum in Adaptively Timed Learning. Recognition, and Movement", *Journal of Cognitive Neuroscience*, vol. 8, 1996, pp. 257-277 by S. Grossberg and J. W. L. Merrill, clarifies how mismatches may be modulated by task-relevance in an adaptively timed way. In particular, the START model suggests how motivationally salient cognitive representations may be enhanced, while orienting responses are inhibited, by an adaptively timed hippocampal dentate-CA3 circuit, during the same time intervals when conditioned responses are disinhibited by an adaptively timed cerebellar circuit. In particular, FIG. 12 summarizes how adaptively timed learning within the dentate-CA3 circuits of the hippocampus inhibits the activation of the orienting system during an interval wherein a valued and predictable goal is being acted upon. Indeed, hippocampal dentate-CA3 cell firing reflects the learned delays observed during the rabbit nictitating membrane response as described in "Role of the Hippocampus in Classical Conditioning of Aversive and Appetitive Behaviors. In: The Hippocampus", New York: Plenum, 1991, pp. 203-239 by T. W. Berger, S. D. Berry, and R. F. Thompson.

This inhibition of the orienting system becomes adaptively timed as follows: Sensory representations "S(1)" send pathways to a spectral timing circuit "T," assumed to be in the "dentate-CA3" region of the hippocampus, whose adaptive weights "w" are trained by a "Now Print," or teaching signal "N." The teaching signal is transiently activated by changes in the activity of the drive representations "D" that occurs when a reinforcing event activates "D." After conditioning of "T" takes place, adaptively timed readout from "T" can maintain attention on task-relevant cues by amplifying their conical representations "S(2)" while inhibiting the orienting system for an adaptively timed duration. "S(1)" and "S(2)" are represented in the thalamus and cortex respectively. "D" is represented in the amygdala.

D.6.3. Navigation

In the third case, the spatial difference between target and actual position is measured on at least one spectrum. In "Space, Time, and Learning in the Hippocampus: How Fine Spatial and Temporal Scales are Expanded into Population Codes for Behavioral Control", *Neural Network*, vol. 20, 2007, pp. 82-93. A. Gorchetchnikov and S. Grossberg have shown how spectral basis functions that represent traversed distance can be used to self-organize allocentric place cells. Furthermore, in "A Simple Neural Network Model of the Hippocampus Suggesting its Path Finding Role in Episodic Memory Retrieval". *Learning and Memory*, vol. 12, 2005, pp. 193-208, A. V. Samsonovich and G. A. Ascoli have shown how to use allocentric place cells to reach a goal in an attractor-like network. The egocentric transitions between allocentric places requires the balancing of reactive and planned behaviors as W. Gnadt and S. Grossberg have addressed in "SOVEREIGN: An Autonomous Neural System for Incrementally Learning Planned Action Sequences to Navigate Towards a Rewarded Goal", *Neural Networks*, vol. 21, 2008, pp. 699-758. If these egocentric transitions are mapped onto a spectrum (or as is in one aspect of the invention, two spectrum, one for angle and one for distance) mismatch between current and expected position could be computed, integrated, and cause spatial navigation. Furthermore, these egocentric transitions must be grounded with an allocentric knot point as described in "A Hierarchy of Associations in Hippocampo-Conical Systems: Cognitive Maps and Navigation Strategies", *Neural Computation*, vol. 17, 2005, pp. 1339-1384 by J. Banquet, P. Gaussier, M. Quoy, and A. Revel, Y. Burnod.

D.7. Hypothalamus

The hypothalamus is known to play a role in the regulation of seasonal and circadian rhythms: the setting of homeostatic demands such as hunger, thirst, and sexual desire; and the distribution of reward signals, as described in "Emotion, Memory, and the Brain", *Scientific America*, vol. 12, 2002, pp. 62-71 by J. E. LeDoux. This aspect of the invention does not treat the first function and uses anatomical labels to distinguish the other two functions.

Internal drives are sensed and passed to the amygdala via the medial hypothalamus, while reward signals are derived from UCS's and passed to the PPTN of the BG via the lateral hypothalamus, as previously discussed "Emotion, Memory, and the Brain", *Scientific America*, vol. 12, 2002, pp. 62-71 by J. E. LeDoux. The onset of an UCS (Un-Conditioned Stimulus) 1216c and 1216d is also registered with the hippocampus for conditioning purposes. The UCS's can induce both negative and positive rewards depending on their aversive or appetitive nature (e.g. an electrical shock v. the taste of something sweet). In the architecture for this aspect of the invention, negative rewards 1206 can also be tripped by repeated hippocampal orienting bursts, and goal-reset signals from frontal cortex, as illustrated in FIG. 12. Lastly, emotionally-charged stimuli passed from the thalamus can induce an immediate drive change in the amygdala. This drive change causes a homeostatic demand in the hypothalamus, which can then instate emotional reactions to the superior colliculus or spinal circuits. Examples of this include startle and freeze reactions.

D.8. Executive Control of Motor Plans

Figure 13:
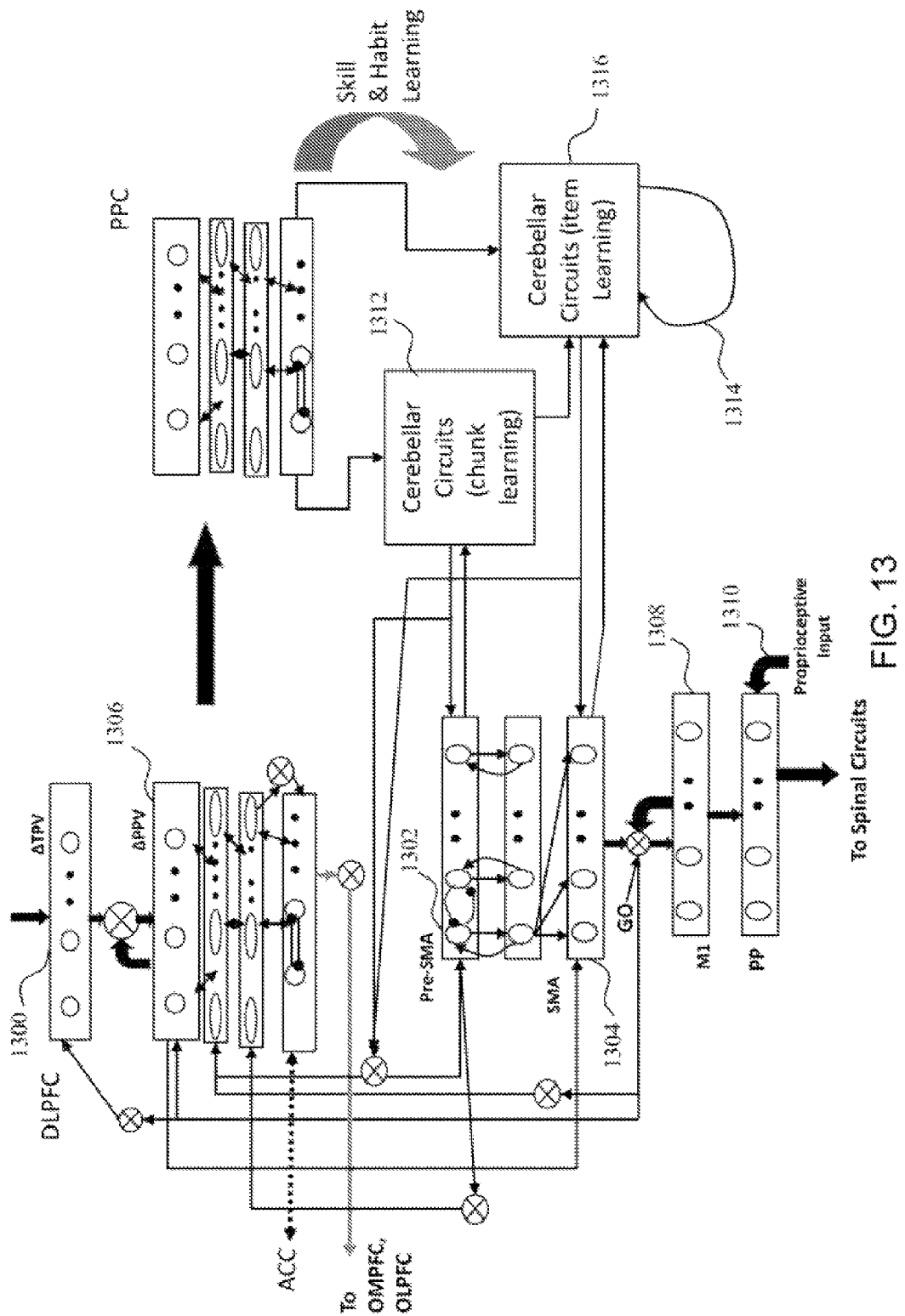
FIG. 13 is a flow diagram of a graphical depiction of the execution of motor schemas in accordance with one aspect of the present invention.

Returning to the DLPFC, one aspect of the invention now considers the executive control of motor plans. For concreteness, this aspect considers a 3 layer motor schema, where M represents the topmost motor schema, Q the layer below that, and P the layer below Q. Each Q is a STORE gradient of P's, while each P is an ART node cluster representing a delta PPV, meaning a vector representing the change in present position joint angles, in the DLPFC 1300 (as illustrated in FIG. 13).

D.8.1. Typical Forward Kinematics Case

When M expands its first Q, a series of P's are downloaded into the competitive queuing of the Pre-Supplementary Motor Area 1302 (Pre-SMA's CO), or competitive queuing (CQ), field. While CQ competition is resolved in the Supplementary Motor Area (SMA) 1304, the first P in DLPFC can be expanded into a delta PPV 1306. This delta PPV is also copied into the primary motor cortex area (M1) 1308, which has been waiting for the competition in SMA 1304 to resolve itself so that its polyvalent cells can release the delta PPV. After M1 releases the delta PPV, it is integrated to endpoint by VITE (Vector Integration to Endpoint) dynamics using the current proprioceptive seed point 1310 (e.g. ESM). While VITE is integrating, the difference vector between target and present position (DV) is approaching zero. When this happens, a reset wave is sent to the P layer in DLPFC, causing a new delta PPV to be placed in M1. The competition in SMA has picked a new P, and M1's polyvalency allows the new delta PPV to be integrated. This process of downloading a delta PPV from DLPFC and resolving competition in SMA continues until Pre-SMA's buffer is exhausted. When the Pre-SMA's buffer is empty, a reset wave is sent to the Q layer in DLPFC. This unfolds a new set of P's into DLPFC, which are downloaded into Pre-SMA. Eventually, the Q layer in DLPFC will also be exhausted causing a reset wave in the M layer. The M layer will be empty if this M was in isolation. However, if this M was pan of a episodic memory, another M will be instantiated.

D.8.2. Backup Inverse Kinematics Case

In the event that DV cannot be brought to zero (due to locked joints or obstructions) within a pre-specified time limit, a gate between M1 and DLPFC's TPV, or target position vector, buffer will be opened. This will allow a new TPV to be downloaded from a path/trajectory schema. To prevent making the same mistake twice, the DV will also be used to mask out those joints that are unresponsive. Given a TPV and a new ESM mask, an inverse kinematics calculation in DLPFC will create a new PPV. This new PPV can be placed into M1. After this PPV has been integrated to endpoint, it will reset the ESM mask placed in the PPV buffer of DLPFC and go back to the next P in DLPFC. Thus the system reverts to the old motor plan. However, this new PPV can make its way into a new motor schema later on.

Learned plans in VLPFC and DLPFC are used by the neural substrates of the N-STREAMS model to learn how to execute the plan in an efficient fashion, as discussed in "Neural Dynamics of Learning and Performance of Fixed Sequences: Latency Pattern Reorganizations and the N-STREAMS Model", Boston University Technical Report CAS/CNS-02-005, Boston, Mass., United States, 2002 by B. Rhodes and D. Bullock. To begin a trial (as shown in FIG. 13), the working memory subsystem of the N-STREAMS model registers a gradient based representation.

Upon completion of the stimulus presentation phase, the spatial gradient is loaded, via the Buffer Load stage, into a Motor Buffer of the execution module (EM) in preparation for performance of the sequence. This loading operation, which is volitionally gated, is the trigger for learning in both the cortical chunking (CC) apparatus 1312 and the chunk loading component of the cerebellar side-loop 1314 in the cerebellar circuits for item learning 1316. Via the declarative working memory stream (downloaded from hARTSTORE), a CC node learns to recognize the working memory representation of the sequence that is being practiced on this trial. This node also learns to instate this same pattern into the declarative memory stream after sufficient learning. Using the actual signals used to load the Motor Buffer as error/teaching signals, the chunk learning component learns to associate the CC contextual signal with the pattern being loaded into the Motor buffer. After practice, this component becomes capable of loading the spatial gradient representing the sequence directly into the Motor Buffer when the learned CC context occurs. Such a loading operation occurs independently of the gating subsystem (it is an automatic consequence of sequence recognition by the CC apparatus 1312). After this brief preparation period, a trigger stimulus is presented whereupon the sequence is to be performed. With "permission" from another volitional gate, the choice field "selects" the channel with the largest Motor Buffer activation, instates a target within that channel, and enables execution of the movement associated with acquiring that target (that is performing that particular item). The Lower level execution module provides the mechanism whereby the model "performs" items.

The components within the EM are highly interconnected and highly interactive. Selection of a channel by the choice field also results in deletion of that item from the Motor Buffer. Amongst the remaining active elements within the Motor Buffer, the one with the highest level of activation will be selected upon completion of the preceding item. In this way the competitive queuing mechanism is able to progressively select item in the sequence in the correct order. This is just one of the many competencies of the EM, each of which is required to ensure faithful execution of the sequence originally loaded into the Motor Buffer.

The item-by-Item learning component of the cerebellar side-loop 1314 operates identically to the chunk-learning component 1312, albeit with different inputs and outputs. The output signals from the choice field are used as error/teaching signals and contextual inputs arises from the CC apparatus, the chunk learning cerebellar component, and recurrently from its own output. The output from this component predictively instates a target for the relevant channel once extensive learning has occurred. Due to the sequential nature of the Choice Field signals (in comparison to the parallel outputs from the Buffer Load stage), outputs from this cerebellar component occur successively, and the adaptive timing competence of the cerebellum becomes very important in enabling progressive reduction of inter response intervals to asymptotic levels. After a few trials for practice for a given sequence, the CC become capable of "making a prediction" that this particular sequence is performed for this trial on the basis of the initial stimuli. Appropriate components have been included in the CC apparatus to enable recovery from erroneous predictions, ensuring that an appropriate representation is present in the declarative working memory stream by the time the volitional loading is performed.

After the moderate levels of practice, the chunk learning cerebellar component 1312 produces suprathreshold output which results in fast loading of the motor buffer, the speed and strength of this cerebellar output is sufficient to force the Choice Field to select the first item during the loading process. The 'pre-commitment' cannot be achieved by the volitional buffer loading operation irrespective of which working memory stream provided the pattern being loaded into the motor buffer. At this stage of the practice, the first item in a sequence can be produced rapidly, with the latency becoming independent of the sequence length. After even more practice, the item-by-item cerebellar component would also start having an influence on the target level of the execution apparatus in the execution module. As a result, the system would not have to wait for a choice field selection. This would allow more rapid transitions between items during performance thereby gradually transforming a procedure into a skill.

This aspect of the invention is modeled by a system and a method comprising a processor performing the operations of: receiving a success threshold from the instructor, using the count of reward signals to compute the reward frequency associated with the executed motor schema; and comparing the success threshold with reward frequency of the executed motor schema and storing the executed motor schema as a habit or skill when the reward frequency meets the success threshold required by the instructor.

(5) ADVANTAGES OF THE EMBODIMENTS OF THE INVENTION

A system was presented for dynamic task selection (executive control) suitable for mapping external inputs and internal goals toward actions that solve problems or elicit external rewards, wherein the system is inspired by cognitive psychology and biology.

The previously described aspects of the present invention have many advantages, including the ability to match the correspondence of the main components of the present invention with cognitive psychology and biology, which allows the present invention to be time efficient and versatile in its implementation and integration into larger scale systems and level applications, while using and taking advantage of complex inputs, of a large subset of PFC functions, of detailed anatomical constrains, and of detailed physiological constraints. Furthermore, the present invention does not require that all the advantageous features need to be incorporated into every embodiment of the invention.

Although the present invention has been described in considerable detail with reference to certain aspects thereof, other embodiments and aspects are possible. Therefore, the spirit and scope of the appended claims should not be limited to the description of the aspects and embodiments contained herein.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "instruction means for" performing a specified function, or "step for" performing a specific function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

What is claimed is:

1. A system for dynamic task selection (executive control) suitable for mapping external inputs and internal goals toward actions that solve problems or elicit external rewards, the system comprising a processor, an input coupled with the processor for receiving a plurality of inputs to be processed into a motor-schema, and a memory coupled with the processor, wherein the memory includes instruction means that are executable by the processor for causing the processor to perform operations of:
   receiving sensory inputs;
   transforming the sensory inputs into clusters of spatial patterns;
   transforming the clusters of spatial patterns into a spatial schema;
   encoding transitions between the spatial schema;
   clustering the spatial schema and encoded spatial schema transitions into a spatio-temporal schema;
   combining the spatial schema with the spatio-temporal schema to create a bimodal spatio-temporal schema;
   receiving a reward input and a punishment input, wherein the reward input and the punishment input reflect a current state of an external environment;
   computing an emotional state and a motivational state from the sensory inputs, the reward input, and the punishment input;
   combining the bimodal spatio-temporal schema with the reward input, the punishment input, the emotional state, and the motivational state to create an external/internal schema (EXIN schema), wherein the EXIN schema provides a compressed representation assessing emotions, motivations, and rewards;
   combining the EXIN schema with the bimodal spatio-temporal schema to create a multimodal spatio-temporal schema, wherein the multimodal spatio-temporal schema serves as an episodic memory that can be replayed by the system;
   receiving structures representing a plurality of elements of a motor system; and
   combining the multimodal spatio-temporal schema with the motor system structures and the EXIN schema to create a motor schema.

2. A system for dynamic task selection as set forth in claim 1, wherein the system performs in two distinct modes, a training mode and a testing mode:
   wherein in the training mode, the created motor schema represents a learnt motor schema associated with emotional and motivational-drive context derived from the EXIN schema following a bottom-up input hierarchy, and the processor further performs the operation of storing the learnt motor schema; and
   wherein in the testing mode, the created motor schema indicates how to perform a particular action, and the processor further performs the operation of feeding back the EXIN schema to be combined with the spatial schema and the spatio-temporal schema to create a top-down bimodal spatio-temporal schema, and the processor further performs the operation of sending the created motor schema to the motor system to perform a particular action.

3. A system for dynamic task selection as set forth in claim 2, wherein the system further comprises an agent to be trained to perform dynamic task selection, an instructor for providing a task to the agent to perform, and a data base of motor schemas that fulfill a plurality of tasks to be selected by the instructor, and wherein the processor further performs the operations of:
   receiving from the instructor a desired task to be performed by the agent;
   selecting from the data base a desired motor schema that fulfills the desired task received from the instructor;
   executing the motor schema created by the system;

comparing a difference measurement between the executed motor schema and the desired motor schema;
computing a progress measurement of the agent from the reward input and the schema difference measurement, wherein the progress measurement increases as the executed motor schema gets closer to the desired motor schema and closer to achieving the desired task, and wherein the progress measurement decreases as the executed motor schema gets farther away from the desired motor schema;
generating a reward signal when the progress measurement increases, indicating that the agent is closer to achieve the desired task;
keeping a count of number of reward signals generated by the system to compute reward frequency associated with the created motor schema;
generating a punishment signal when the progress measurement decreases, indicating that the agent is not achieving the desired task;
keeping a count of number of punishment signals generated by the system; and
feeding back the reward signal and punishment signal to be inputted into the system as reward input and punishment input, respectively.

4. A system for dynamic task selection as set forth in claim 3, wherein the processor further performs the operations of:
receiving a mismatch threshold from the instructor;
comparing a mismatch threshold with the count of punishment signals and generating a mismatch reset signal when the count of punishment signals exceeds the mismatch threshold; and
sending the mismatch reset signal to the multimodal pre-processor, wherein mismatch reset signal forces the multimodal pre-processor to deselect the EXIN schema and to further perform the operation of creating a new EXIN schema; and
sending the mismatch reset signal to the motor system to shut-off motor channels and stop the motor system from performing the particular action being performed.

5. A system for dynamic task selection as set forth in claim 4, wherein the processor further performs the operations of:
combining the sensory inputs with the count of reward signals to create a reset toggle signal when the count of reward signals is drastically reduced or the sensory inputs reflect significantly changed emotional states; and
sending the reset toggle signal to the multimodal pre-processor, wherein reset toggle signal forces the multimodal pre-processor to stop creating the EXIN schema; and
sending the reset toggle signal to the motor system to shut-off motor channels and stop the motor system from performing actions.

6. A system for dynamic task selection as set forth in claim 5, wherein the processor further performs the operations of:
receiving a success threshold from the instructor;
using the count of reward signals to compute the reward frequency associated with the executed motor schema; and
comparing the success threshold with reward frequency of the executed motor schema and storing the executed motor schema as a habit or skill when the reward frequency meets the success threshold required by the instructor.

7. A system for dynamic task selection as set forth in claim 6, wherein the reward input is further used as an enticing reset signal when the punishment input has a high value, whereby the enticing reset signal forces the system to deselect the EXIN schemas and continue creating new EXIN schemas despite the high value of the punishment input.

8. A system for dynamic task selection as set forth in claim 7, wherein the processor further performs the operations of:
calculating set of statistics reflecting primacy/recency, frequency of occurrence, and reward and punishment associated with the biomodal spatio-temporal schema, with the multimodal spatio-temporal schema, and with the motor schema;
analyzing the set of statistics to resolve conflicts generated by a suddenly changing desired task or suddenly changing sensory inputs;
creating a conflict resolution signal based on the set of statistics, wherein the conflict resolution signal selects, to be processed, schemas that are more frequently executed and that have high reward signals associated with the schemas, and also selects to be processed schemas that are more recently executed than older schemas.

9. A system for dynamic task selection as set forth in claim 8, wherein the EXIN schema is created by further combining the spatio-temporal schema with the bimodal spatio-temporal schema, the reward input, the punishment input, the emotional state, and the motivational state; wherein the motor schema is created by further combining the spatial schema and the bimodal spatio-temporal schema with the multimodal spatio-temporal schema, the motor system structures, and the EXIN schema; and wherein the sensory inputs are selected from a group consisting of: visual inputs, auditory inputs, kinematic inputs, tactile inputs, olfactory inputs, somatosensory inputs, and motor inputs.

10. A system for dynamic task selection as set forth in claim 9, wherein the operations performed by the processor are defined by differential equations with timing constraints that are implemented on a serial computer or on a parallel Analog Pulse Processing computer, wherein the EXIN schema corresponds to compressed representations of an EXternal motivator and INternal states and the motor schema corresponds to a sequence of joint rotations, where space corresponds to the joint rotations and time corresponds to a course taken by the joint rotations along the particular action; and wherein the EXIN schemas, the motor schemas, and the spatio-temporal schemas are encoded and recognized via a spatio-temporal algorithm selected from a group consisting of: hierarchical Adaptive Resonance Theory Store (hART-STORE) network, hierarchical temporal memory (HTM), sequence of clusters (SOC) and deep belief network (DBN).

11. A system for dynamic task selection as set forth in claim 1, wherein the system further comprises an agent to be trained to perform dynamic task selection, an instructor for providing a task to the agent to perform, and a data base of motor schemas that fulfill a plurality of tasks to be selected by the instructor, and wherein the processor further performs the operations of:
receiving from the instructor a desired task to be performed by the agent;
selecting from the data base a desired motor schema that fulfills the desired task received from the instructor;
executing the motor schema created by the system;
comparing a difference measurement between the executed motor schema and the desired motor schema;
computing a progress measurement of the agent from the reward input and the schema difference measurement, wherein the progress measurement increases as the executed motor schema gets closer to the desired motor schema and closer to achieving the desired task, and wherein the progress measurement decreases as the executed motor schema gets farther away from the desired motor schema;

generating a reward signal when the progress measurement increases, indicating that the agent is closer to achieve the desired task;

keeping a count of number of reward signals generated by the system to compute reward frequency associated with the created motor schema;

generating a punishment signal when the progress measurement decreases, indicating that the agent is not achieving the desired task;

keeping a count of number of punishment signals generated by the system; and feeding back the reward signal and punishment signal to be inputted into the system as reward input and punishment input, respectively.

12. A system for dynamic task selection as set forth in claim 11, wherein the processor further performs the operations of:

receiving a mismatch threshold from the instructor;

comparing mismatch threshold with the count of punishment signals and generating a mismatch reset signal when the count of punishment signals exceeds the mismatch threshold; and sending the mismatch reset signal to the multimodal pre-processor, wherein mismatch reset signal forces the multimodal pre-processor to deselect the EXIN schema and to further perform the operation of creating a new EXIN schema; and sending the mismatch reset signal to the motor system to shut-off motor channels and stop the motor system from performing the particular action being performed.

13. A system for dynamic task selection as set forth in claim 11, wherein the processor further performs the operations of:

combining the sensory inputs with the count of reward signals to create a reset toggle signal when the count of reward signals is drastically reduced or the sensory inputs reflect significantly changed emotional states; and sending the reset toggle signal to the multimodal pre-processor, wherein reset toggle signal forces the multimodal pre-processor to stop creating the EXIN schema; and sending the reset toggle signal to the motor system to shut-off motor channels and stop the motor system from performing actions.

14. A system for dynamic task selection as set forth in claim 11, wherein the processor further performs the operations of:

receiving a success threshold from the instructor, using the count of reward signals to compute the reward frequency associated with the executed motor schema; and comparing the success threshold with reward frequency of the executed motor schema and storing the executed motor schema as a habit or skill when the reward frequency meets the success threshold required by the instructor.

15. A system for dynamic task selection as set forth in claim 1, wherein the reward input is further used as an enticing reset signal when the punishment input has a high value, whereby the enticing reset signal forces the system to deselect the EXIN schemas and continue creating new EXIN schemas despite the high value of the punishment input.

16. A system for dynamic task selection as set forth in claim 1, wherein the processor further performs the operations of:

calculating set of statistics reflecting primacy/recency, frequency of occurrence, and reward and punishment associated with the biomodal spatio-temporal schema, with the multimodal spatio-temporal schema, and with the motor schema;

analyzing the set of statistics to resolve conflicts generated by a suddenly changing desired task or suddenly changing sensory inputs;

creating a conflict resolution signal based on the set of statistics, wherein the conflict resolution signal selects, to be processed, schemas that are more frequently executed and that have high reward signals associated with the schemas, and also selects to be processed schemas that are more recently executed than older schemas.

17. A system for dynamic task selection as set forth in claim 1, wherein the EXIN schema is created by further combining the spatio-temporal schema with the bimodal spatio-temporal schema, the reward input, the punishment input, the emotional state, and the motivational state; wherein the motor schema is created by further combining the spatial schema and the bimodal spatio-temporal schema with the multimodal spatio-temporal schema, the motor system structures, and the EXIN schema; and wherein the sensory inputs are selected from a group consisting of: visual inputs, auditory inputs, kinematic inputs, tactile inputs, olfactory inputs, somatosensory inputs, and motor inputs.

18. A system for dynamic task selection as set forth in claim 1, wherein the operations performed by the processor are defined by differential equations with timing constraints that are implemented on a serial computer or on a parallel Analog Pulse Processing computer; wherein the EXIN schema corresponds to compressed representations of an EXternal motivator and INternal states and the motor schema corresponds to a sequence of joint rotations, where space corresponds to the joint rotations and time corresponds to a course taken by the joint rotations along the particular action; and wherein the EXIN schemas, the motor schemas, and the spatio-temporal schemas are encoded and recognized via a spatio-temporal algorithm selected from a group consisting of: hierarchical Adaptive Resonance Theory Store (hART-STORE) network, hierarchical temporal memory (HTM), sequence of clusters (SOC), and deep belief network (DBN).

19. A computer implemented method for dynamic task selection (executive control) suitable for mapping external inputs and internal goals toward actions that solve problems or elicit external rewards, the method comprising an act of causing a processor to execute instructions encoded on a memory, such that upon execution, the processor perform operations of:

receiving sensory inputs;

transforming the sensory inputs into clusters of spatial patterns;

transforming the clusters of spatial patterns into a spatial schema;

encoding transitions between the spatial schema;

clustering the spatial schema and encoded spatial schema transitions into a spatio-temporal schema;

combining the spatial schema with the spatio-temporal schema to create a bimodal spatio-temporal schema;

receiving a reward input and a punishment input, wherein the reward input and the punishment input reflect a current state of an external environment;

computing an emotional state and a motivational state from the sensory inputs, the reward input, and the punishment input;

combining the bimodal spatio-temporal schema with the reward input, the punishment input, the emotional state, and the motivational state to create an external/internal schema (EXIN schema), wherein the EXIN schema provides a compressed representation assessing emotions, motivations, and rewards;

combining the EXIN schema with the bimodal spatio-temporal schema to create a multimodal spatio-temporal schema, wherein the multimodal spatio-temporal schema serves as an episodic memory that can be replayed by the computer implemented method;

receiving structures representing a plurality of elements of a motor system; and combining the multimodal spatio-temporal schema with the motor system structures and the EXIN schema to create a motor schema.

20. A computer implemented method for dynamic task selection as set forth in claim 19, wherein the method behaves in two distinct modes, a training mode and a testing mode:

wherein in the training mode, the created motor schema represents a learnt motor schema associated with emotional and motivational-drive context derived from the EXIN schema following a bottom-up input hierarchy, and the processor further performs the operation of storing the learnt motor schema; and wherein in the testing mode, the created motor schema indicates how to perform a particular action, and the processor further performs the operation of feeding back the EXIN schema to be combined with the spatial schema and the spatio-temporal schema to create a top-down bimodal spatio-temporal schema, and the processor further performs the operation of sending the created motor schema to the motor system to perform a particular action.

21. A computer implemented method for dynamic task selection as set forth in claim 20, wherein the method is used by an agent to be trained to perform dynamic task selection along with an instructor that provides a task to the agent to perform, and wherein the method uses a data base of motor schemas that fulfill a plurality of tasks to be selected by the instructor, and wherein the processor further performs the operations of:

receiving from the instructor a desired task to be performed by the agent;

selecting from the data base a desired motor schema that fulfills the desired task received from the instructor;

executing the motor schema previously created by the operations performed by the processor;

comparing a difference measurement between the executed motor schema and the desired motor schema;

computing a progress measurement of the agent from the reward input and the schema difference measurement, wherein the progress measurement increases as the executed motor schema gets closer to the desired motor schema and closer to achieving the desired task, and wherein the progress measurement decreases as the executed motor schema gets farther away from the desired motor schema;

generating a reward signal when the progress measurement increases, indicating that the agent is closer to achieve the desired task;

keeping a count of number of reward signals generated by the computer implemented method to compute reward frequency associated with the created motor schema;

generating a punishment signal when the progress measurement decreases, indicating that the agent is not achieving the desired task;

keeping a count of number of punishment signals generated by the computer implemented method; and feeding back the reward signal and punishment signal to be inputted into the computer implemented method as reward input and punishment input, respectively.

22. A computer implemented method for dynamic task selection as set forth in claim 21, wherein the processor further performs the operations of:

receiving a mismatch threshold from the instructor;

comparing mismatch threshold with the count of punishment signals and generating a mismatch reset signal when the count of punishment signals exceeds the mismatch threshold; and sending the mismatch reset signal to the multimodal pre-processor, wherein mismatch reset signal forces the multimodal pre-processor to deselect the EXIN schema and to further perform the operation of creating a new EXIN schema; and sending the mismatch reset signal to the motor system to shut-off motor channels and stop the motor system from performing the particular action being performed.

23. A computer implemented method for dynamic task selection as set forth in claim 22, wherein the processor further performs the operations of:

combining the sensory inputs with the count of reward signals to create a reset toggle signal when the count of reward signals is drastically reduced or the sensory inputs reflect significantly changed emotional states; and sending the reset toggle signal to the multimodal pre-processor, wherein reset toggle signal forces the multimodal pre-processor to stop creating the EXIN schema; and sending the reset toggle signal to the motor system to shut-off motor channels and stop the motor system from performing actions.

24. A computer implemented method for dynamic task selection as set forth in claim 23, wherein the processor further performs the operations of:

receiving a success threshold from the instructor;

using the count of reward signals to compute the reward frequency associated with the executed motor schema; and comparing the success threshold with reward frequency of the executed motor schema and storing the executed motor schema as a habit or skill when the reward frequency meets the success threshold required by the instructor.

25. A computer implemented method for dynamic task selection as set forth in claim 24, wherein the reward input is further used as an enticing reset signal when the punishment input has a high value, whereby the enticing reset signal forces the computer implemented method to deselect the EXIN schemas and continue creating new EXIN schemas despite the high value of the punishment input.

26. A computer implemented method for dynamic task selection as set forth in claim 25, wherein the processor further performs the operations of:

calculating set of statistics reflecting primacy/recency, frequency of occurrence, and reward and punishment associated with the biomodal spatio-temporal schema, with the multimodal spatio-temporal schema, and with the motor schema;

analyzing the set of statistics to resolve conflicts generated by a suddenly changing desired task or suddenly changing sensory inputs;

creating a conflict resolution signal based on the set of statistics, wherein the conflict resolution signal selects, to be processed, schemas that are more frequently executed and that have high reward signals associated with the schemas, and also selects to be processed schemas that are more recently executed than older schemas.

27. A computer implemented method for dynamic task selection as set forth in claim 26, wherein the EXIN schema is created by further combining the spatio-temporal schema with the bimodal spatio-temporal schema, the reward input, the punishment input, the emotional state, and the motivational state; wherein the motor schema is created by further combining the spatial schema and the bimodal spatio-temporal schema with the multimodal spatio-temporal schema, the motor system structures, and the EXIN schema; and wherein the sensory inputs are selected from a group consisting of: visual inputs, auditory inputs, kinematic inputs, tactile inputs, olfactory inputs, somatosensory inputs, and motor inputs.

28. A computer implemented method for dynamic task selection as set forth in claim 27, wherein the operations performed by the processor are defined by differential equations with timing constraints that are implemented on a serial computer or on a parallel Analog Pulse Processing computer; wherein the EXIN schema corresponds to compressed representations of an EXternal motivator and INternal states and the motor schema corresponds to a sequence of joint rotations, where space corresponds to the joint rotations and time corresponds to a course taken by the joint rotations along the particular action; and wherein the EXIN schemas, the motor schemas, and the spatio-temporal schemas are encoded and recognized via a spatio-temporal algorithm selected from a group consisting of: hierarchical Adaptive Resonance Theory Store (hARTSTORE) network, hierarchical temporal memory (HTM), sequence of clusters (SOC), and deep belief network (DBN).

29. A computer implemented method for dynamic task selection as set forth in claim 19, wherein the computer implemented method is used by an agent to be trained to perform dynamic task selection and by an instructor that provides a task to the agent to perform, and wherein the method uses a data base of motor schemas that fulfill a plurality of tasks to be selected by the instructor, and wherein the processor further performs the operations of:

receiving from the instructor a desired task to be performed by the agent;

selecting from the data base a desired motor schema that fulfills the desired task received from the instructor;

executing the motor schema created by the computer implemented method;

comparing a difference measurement between the executed motor schema and the desired motor schema;

computing a progress measurement of the agent from the reward input and the schema difference measurement, wherein the progress measurement increases as the executed motor schema gets closer to the desired motor schema and closer to achieving the desired task, and wherein the progress measurement decreases as the executed motor schema gets farther away from the desired motor schema;

generating a reward signal when the progress measurement increases, indicating that the agent is closer to achieve the desired task;

keeping a count of number of reward signals generated by the computer implemented method to compute reward frequency associated with the created motor schema;

generating a punishment signal when the progress measurement decreases, indicating that the agent is not achieving the desired task;

keeping a count of number of punishment signals generated by the computer implemented method; and feeding back the reward signal and punishment signal to be inputted into the computer implemented method as reward input and punishment input, respectively.

30. A computer implemented method for dynamic task selection as set forth in claim 29, wherein the processor further performs the operations of:

receiving a mismatch threshold from the instructor;

comparing mismatch threshold with the count of punishment signals and generating a mismatch reset signal when the count of punishment signals exceeds the mismatch threshold; and sending the mismatch reset signal to the multimodal pre-processor, wherein mismatch reset signal forces the multimodal pre-processor to deselect the EXIN schema and to further perform the operation of creating a new EXIN schema; and sending the mismatch reset signal to the motor system to shut-off motor channels and stop the motor system from performing the particular action being performed.

31. A computer implemented method for dynamic task selection as set forth in claim 29, wherein the processor further performs the operations of:

combining the sensory inputs with the count of reward signals to create a reset toggle signal when the count of reward signals is drastically reduced or the sensory inputs reflect significantly changed emotional states; and sending the reset toggle signal to the multimodal pre-processor, wherein reset toggle signal forces the multimodal pre-processor to stop creating the EXIN schema; and sending the reset toggle signal to the motor system to shut-off motor channels and stop the motor system from performing actions.

32. A computer implemented method for dynamic task selection as set forth in claim 29, wherein the processor further performs the operations of:

receiving a success threshold from the instructor;

using the count of reward signals to compute the reward frequency associated with the executed motor schema; and comparing the success threshold with reward frequency of the executed motor schema and storing the executed motor schema as a habit or skill when the reward frequency meets the success threshold required by the instructor.

33. A computer implemented method for dynamic task selection as set forth in claim 19, wherein the reward input is further used as an enticing reset signal when the punishment input has a high value, whereby the enticing reset signal forces the computer implemented method to deselect the EXIN schemas and continue creating new EXIN schemas despite the high value of the punishment input.

34. A computer implemented method for dynamic task selection as set forth in claim 19, wherein the processor further performs the operations of:

calculating set of statistics reflecting primacy/recency, frequency of occurrence, and reward and punishment associated with the biomodal spatio-temporal schema, with the multimodal spatio-temporal schema, and with the motor schema;

analyzing the set of statistics to resolve conflicts generated by a suddenly changing desired task or suddenly changing sensory inputs;

creating a conflict resolution signal based on the set of statistics, wherein the conflict resolution signal selects, to be processed, schemas that are more frequently executed and that have high reward signals associated with the schemas, and also selects to be processed schemas that are more recently executed than older schemas.

35. A computer implemented method for dynamic task selection as set forth in claim 19, wherein the EXIN schema is created by further combining the spatio-temporal schema with the bimodal spatio-temporal schema, the reward input, the punishment input, the emotional state, and the motivational state; wherein the motor schema is created by further combining the spatial schema and the bimodal spatio-temporal schema with the multimodal spatio-temporal schema, the motor system structures, and the EXIN schema; and wherein the sensory inputs are selected from a group consisting of: visual inputs, auditory inputs, kinematic inputs, tactile inputs, olfactory inputs, somatosensory inputs, and motor inputs.

36. A computer implemented method for dynamic task selection as set forth in claim 19, wherein the operations performed by the processor are defined by differential equations with timing constraints that are implemented on a serial computer or on a parallel Analog Pulse Processing computer; wherein the EXIN schema corresponds to compressed representations of an EXternal motivator and INternal states and the motor schema corresponds to a sequence of joint rotations, where space corresponds to the joint rotations and time corresponds to a course taken by the joint rotations along the particular action; and wherein the EXIN schemas, the motor schemas, and the spatio-temporal schemas are encoded and recognized via a spatio-temporal algorithm selected from a group consisting of: hierarchical Adaptive Resonance Theory Store (hARTSTORE) network, hierarchical temporal memory (HTM), sequence of clusters (SOC), and deep belief network (DBN).

* * * * *